United States Patent
Kifuji et al.

(10) Patent No.: US 9,893,648 B2
(45) Date of Patent: Feb. 13, 2018

(54) POWER CONVERTING DEVICE, AND POWER CONDITIONER USING SAME

(71) Applicant: Panasonic Intellectual Property Management Co., Ltd., Osaka (JP)

(72) Inventors: Mariko Kifuji, Fukuoka (JP); Kazunori Kidera, Osaka (JP); Mitsuru Tanabe, Osaka (JP); Kazuo Itoh, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 15/504,808

(22) PCT Filed: Oct. 28, 2015

(86) PCT No.: PCT/JP2015/005428
§ 371 (c)(1),
(2) Date: Feb. 17, 2017

(87) PCT Pub. No.: WO2016/067613
PCT Pub. Date: May 6, 2016

(65) Prior Publication Data
US 2017/0310242 A1   Oct. 26, 2017

(30) Foreign Application Priority Data

Oct. 29, 2014   (JP) ................ 2014-220475

(51) Int. Cl.
*H02M 7/539*   (2006.01)
(52) U.S. Cl.
CPC .................. *H02M 7/539* (2013.01)
(58) Field of Classification Search
CPC ........... H02M 7/5387; H02M 7/53871; H02M 7/53873; H02M 7/539
(Continued)

(56) References Cited

U.S. PATENT DOCUMENTS 7,639,515 B2 * 12/2009 Ponnaluri ............. H02M 7/487
  363/131
2013/0044526 A1 * 2/2013 Soua ..................... H02M 7/487
  363/131
(Continued)

FOREIGN PATENT DOCUMENTS

EP   1282934 A1   2/2003
EP   2608386 A2   6/2013
(Continued)

OTHER PUBLICATIONS

International Search Report for corresponding International Application No. PCT/JP2015/005428 dated Jan. 19, 2016.
(Continued)

*Primary Examiner* — Jeffrey Sterrett
(74) *Attorney, Agent, or Firm* — Renner Otto Boisselle & Sklar, LLP

(57) ABSTRACT

A controller switches between modes each having a different connection state of a DC power supply and the capacitor with respect to first and second output points by controlling switches. A generation unit generates a reference wave including at least one carrier wave. The modes are classified into a sustaining mode in which no current is caused to flow to the capacitor, a charging mode in which a current is caused to flow to the capacitor, and a discharging mode in which a current in a direction opposite to that in the charging mode is caused to flow to the capacitor. The controller switches between the sustaining mode and a charging or discharging mode according to the comparison result between a signal wave and the reference wave.

14 Claims, 15 Drawing Sheets

(58) Field of Classification Search
USPC .............................. 363/43, 97, 98, 131, 132
See application file for complete search history.

(56) References Cited

U.S. PATENT DOCUMENTS

| | | | |
|---|---|---|---|
| 2013/0114320 A1* | 5/2013 | Permuy | H02J 7/0016 363/131 |
| 2014/0009984 A1 | 1/2014 | Takizawa | |
| 2014/0063884 A1 | 3/2014 | Itoh et al. | |
| 2015/0009734 A1* | 1/2015 | Stahl | H02M 7/483 363/98 |
| 2015/0249403 A1* | 9/2015 | Sato | H02M 7/483 363/127 |

FOREIGN PATENT DOCUMENTS

| | | |
|---|---|---|
| JP | 4369425 B2 | 11/2009 |
| JP | 2010-93978 A | 4/2010 |
| JP | 2013-42591 A | 2/2013 |
| JP | 2014-17957 A | 1/2014 |
| JP | 2014-50134 A | 3/2014 |
| JP | 2014-64431 A | 4/2014 |
| WO | WO 2005/036719 A1 | 4/2005 |

OTHER PUBLICATIONS

Form PCT/ISA/237 for corresponding International Application No. PCT/JP2015/005428 dated Jan. 19, 2016.
Extended European Search Report dated Oct. 23, 2017 for corresponding European Application No. EP 15853795.1.
Roshankumar P. et al., "A Five-Level Inverter Topology with Single-DC Supply by Cascading a Flying Capacitor Inverter and an H-Bridge", vol. 27, No. 8, pp. 3505-3512, Aug. 1, 2012.

* cited by examiner

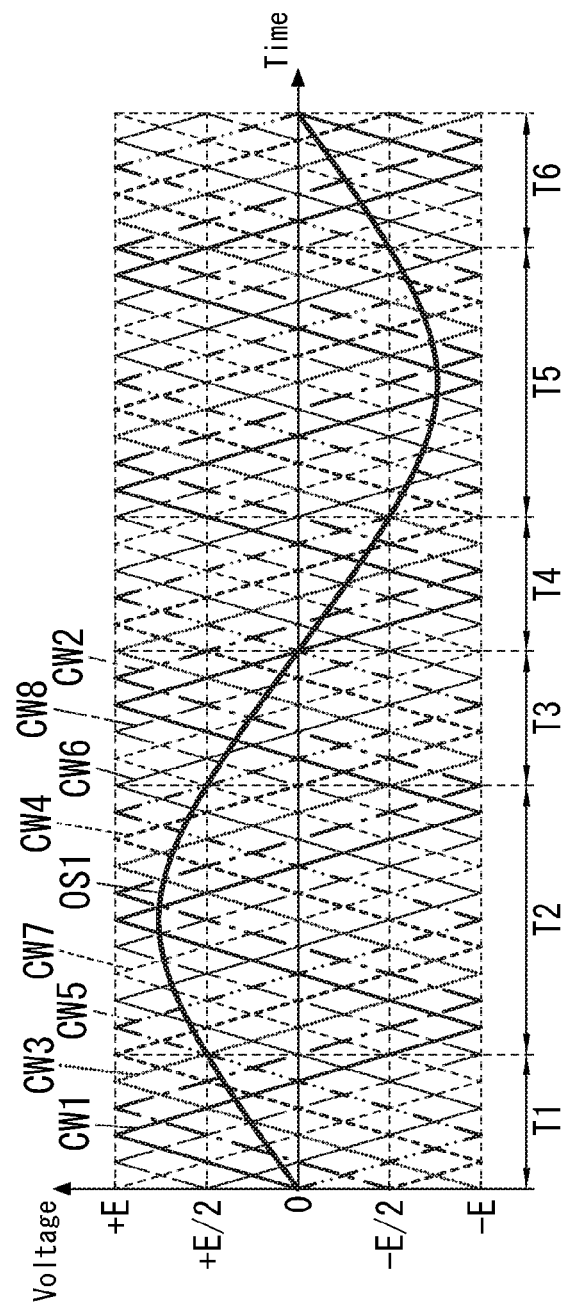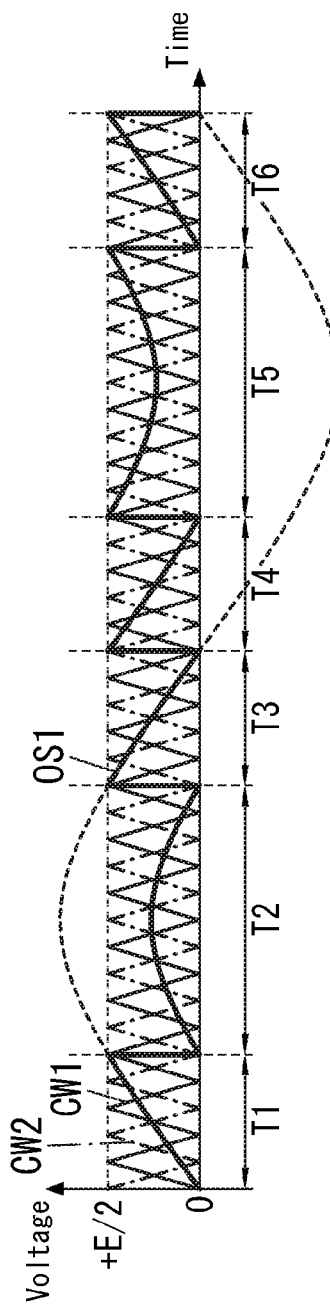
FIG. 13
FIG. 14

POWER CONVERTING DEVICE, AND POWER CONDITIONER USING SAME

TECHNICAL FIELD

This invention relates to power-converting devices and power conditioners with the power-converting devices.

BACKGROUND ART

In recent years, as DC power supplies for houses such as a solar power generator, a fuel cell, and an electric storage device become widespread, various circuits are proposed and provided as power-converting devices that convert outputs of these DC power supplies to AC. For example, in JP 2014-64431 A (Paragraphs [0002] to [0006], FIGS. 16 and 17, hereinafter referred to as Document 1) and in JP 4369425 B2 (hereinafter referred to as Document 2), power-converting devices ("multilevel power-converting device" in Document 1, "converter circuit" in Document 2) that generate AC outputs having voltage levels from a DC voltage supply are disclosed.

According to the description in Document 1, the power-converting device is a five-level inverter that outputs voltages of five levels, and includes two DC capacitors, two flying capacitors, and ten switching elements. The power-converting device outputs voltages of five levels by controlling the switching elements such that, in a state in which a DC voltage E is applied to a series circuit of the two DC capacitors, the voltage of each DC capacitor is E/2 and the voltage of each flying capacitor is E/4.

Incidentally, the power-converting device having the configuration described above includes, in modes having different output voltages, a mode in which the output voltage is generated by discharging the capacitor (flying capacitor). Therefore, the voltage of the capacitor is not always kept at a constant value. As a result, it is possible that the power-converting device will not generate a desired output voltage in the case where the fluctuation of the voltage of the capacitor is relatively large. Also, there is a problem in that, when a capacitor having a relatively large capacitance is used so as to suppress the fluctuation of the voltage of the capacitor, the size of the capacitor increases.

SUMMARY OF INVENTION

The present invention has been made in view of the above-described problems, and an object of the present invention is to provide a power-converting device in which the size of a capacitor can be reduced, and a power conditioner that uses the power-converting device.

A power-converting device according to one aspect of the invention includes: a conversion circuit that includes switches and a capacitor, and is electrically connected between a first input point on a high potential side of a DC power supply and a second input point on a low potential side of the DC power supply; a controller configured to switch between modes in each of which a connection state of the DC power supply and the capacitor with respect to a first output point and a second output point is different by controlling the switches, and change a magnitude of an output voltage to be generated between the first output point and the second output point in multi-levels according to a signal wave that is based on a target value of the output voltage; and a generation unit configured to generate a reference wave constituted by at least one carrier wave. The modes are classified into a sustaining mode in which a current is not caused to flow to the capacitor, a charging mode in which the capacitor is charged by causing a current to flow to the capacitor, and a discharging mode in which the capacitor is discharged by causing a current to flow to the capacitor in a direction opposite to that in the charging mode. The controller is configured to switch between the sustaining mode and the charging mode or the discharging mode according to a result of comparison between the signal wave and the reference wave.

A power conditioner according to one aspect of the invention includes: the power-converting device described above; and a parallel off device that is electrically connected between the first and second output points and a utility grid.

BRIEF DESCRIPTION OF DRAWINGS

The figures depict one or more implementations in accordance with the present teaching, by way of example only, not by way of limitation. In the figures, like reference numerals refer to the same or similar elements where:

FIG. 13 is a waveform diagram illustrating a relationship between a signal wave and a reference wave in a reference example of Embodiment 2;

FIG. 14 is a waveform diagram illustrating a relationship between a signal wave and a reference wave in a reference example of Embodiment 2;

DESCRIPTION OF EMBODIMENTS

Embodiments described below relates to, in general, power-converting devices and power conditioners with the power-converting devices, and specifically, relates to a power-converting device that converts power from a DC power supply and a power conditioner with the power-converting device.

Embodiment 1

Figure 1:
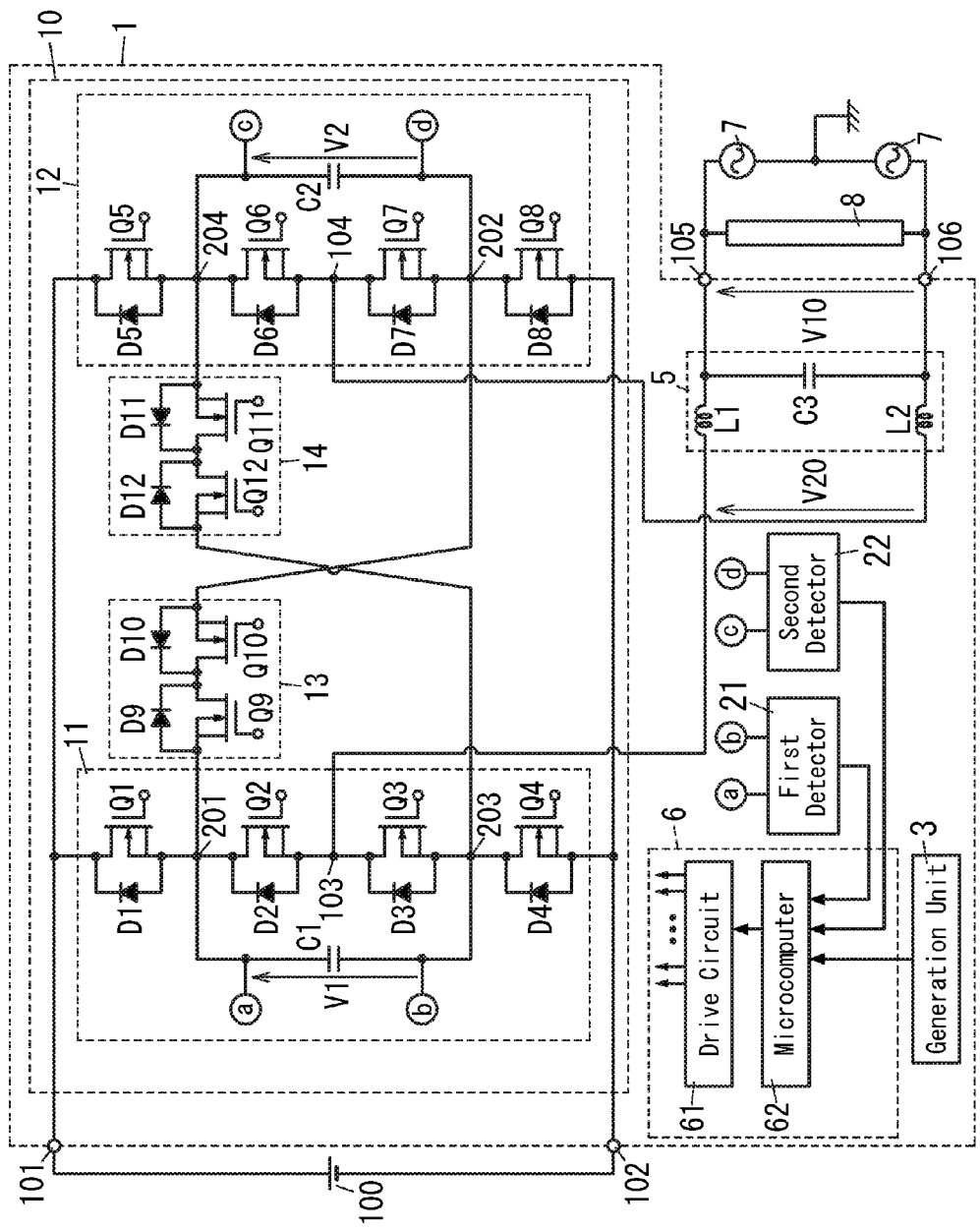
FIG. 1 is a circuit diagram illustrating a configuration of a power-converting device according to Embodiment 1.

A power-converting device 1 according to the present embodiment includes a conversion circuit 10, a controller 6, and a generation unit 3, as shown in FIG. 1.

The conversion circuit 10 includes switches and a capacitor. The conversion circuit 10 is electrically connected between a first input point 101 on a high potential side of a DC power supply 100 and a second input point 102 on a low potential side of the DC power supply 100. In the example in FIG. 1, the switches are constituted by first to eighth switching elements Q1 to Q8, a first bi-directional switch 13, and a second bi-directional switch 14. Also, in the example in FIG. 1, the capacitor is constituted by a first capacitor C1 and a second capacitor C2.

The controller 6 switches between modes having different connection states between the DC power supply 100 and the capacitor with respect to a first output point 103 and a second output point 104 by controlling the switches. Accordingly, the controller 6 changes the magnitude of an output voltage V20 generated between the first output point 103 and the second output point 104 in multi-levels according to a signal wave based on a target value of the output voltage V20.

The generation unit 3 generates a reference wave that is constituted by at least one carrier wave.

Here, the modes are classified into a sustaining mode in which a current is not caused to flow to the capacitor, a charging mode in which a current is caused to flow to the capacitor, and a discharging mode in which a current is caused to flow to the capacitor in a direction opposite to that in the charging mode. That is, the charging mode is a mode for charging the capacitor by causing a current to flow to the capacitor, and the discharging mode is a mode for discharging the capacitor by causing a current to flow to the capacitor in a direction opposite to that in the charging mode.

The controller 6 is configured so as to switch between the sustaining mode and a charging or discharging mode according to the result of comparison between the signal wave and the reference wave.

According to this configuration, the power-converting device 1 switches between the sustaining mode in which charging and discharging of the capacitor is not performed, and the charging mode in which charging of the capacitor is performed or the discharging mode in which discharging of the capacitor is performed, according to the result of comparison between the signal wave and the reference wave. That is, the power-converting device 1 can switch between the sustaining mode and a charging or discharging mode according to the cycle of the at least one carrier wave that constitutes the reference wave. Therefore, the power-converting device 1 can frequently switch between charging and discharging of the capacitor by increasing the frequency of the carrier wave (that is, by shortening the cycle length), and thereby voltage fluctuation of the capacitor can be minimized. As a result, the power-converting device 1 can suppress voltage fluctuation of the capacitor and obtain a desired output voltage V20 while including a capacitor having a relatively small capacitance, resulting in having an advantage in that the size of the capacitor can be reduced.

Specifically, in the present embodiment, the conversion circuit 10 includes a first conversion circuit 11, a second conversion circuit 12, the first bi-directional switch 13, and the second bi-directional switch 14, as shown in FIG. 1. The first conversion circuit 11 and the second conversion circuit 12 are electrically connected in parallel between the first input point 101 and the second input point 102. The first bi-directional switch 13 and the second bi-directional switch 14 are electrically connected between the first conversion circuit 11 and the second conversion circuit 12.

The first conversion circuit 11 includes the first to fourth switching elements Q1 to Q4 and the first capacitor C1. Here, the connection point between the second switching element Q2 and the third switching element Q3 is the first output point 103.

The first to fourth switching elements Q1 to Q4 are electrically connected in series between the first input point 101 and the second input point 102. The first to fourth switching elements Q1 to Q4 are connected in series in the order of the first switching element Q1, the second switching element Q2, the third switching element Q3, and the fourth switching element Q4 from the first input point 101 side. The first capacitor C1 is electrically connected in parallel to a series circuit of the second switching element Q2 and the third switching element Q3.

The second conversion circuit 12 includes the fifth to eighth switching elements Q5 to Q8 and the second capacitor C2. Here, the connection point between the sixth switching element Q6 and the seventh switching element Q7 is the second output point 104.

The fifth to eighth switching elements Q5 to Q8 are electrically connected in series between the first input point 101 and the second input point 102. The fifth to eighth switching elements Q5 to Q8 are connected in series in the order of the fifth switching element Q5, the sixth switching element Q6, the seventh switching element Q7, and the eighth switching element Q8 from the first input point 101 side. The second capacitor C2 is electrically connected in parallel to a series circuit of the sixth switching element Q6 and the seventh switching element Q7.

The first bi-directional switch 13 is electrically connected between a first connection point 201 which is a connection point of the first switching element Q1 and the second switching element Q2, and a second connection point 202 which is a connection point of the seventh switching element Q7 and the eighth switching element Q8.

The second bi-directional switch 14 is electrically connected between a third connection point 203 which is a connection point of the third switching element Q3 and the fourth switching element Q4, and a fourth connection point 204 which is a connection point of the fifth switching element Q5 and the sixth switching element Q6.

As described above, the first to eighth switching elements Q1 to Q8, the first bi-directional switch 13, and the second bi-directional switch 14 constitute the switches, and the first capacitor C1 and the second capacitor C2 constitute the capacitor.

Hereinafter, the power-converting device 1 according to the present embodiment and a power conditioner 20 (refer to FIG. 7) with the power-converting device 1 will be described in detail. Note that the configuration described below is merely an example of the present invention, and the present invention is not limited to the present embodiment and later-described Embodiments 2 and 3. In addition to these embodiments, various modifications can be made according to the design or the like, as long as they do not depart from the technical concept of the present invention.

In the present embodiment, a case in which the power conditioner 20 is a power conditioner for residential use that is used in a state of being electrically connected to a solar power generator serving as the DC power supply 100 will be described as an example, but the application of the power conditioner 20 is not limited thereto. The power conditioner 20 may be used in a state of being electrically connected to a DC power supply 100, other than that in a solar power generator, such as a fuel cell for home use or an electric storage device. Also, the power conditioner 20 may be used in non-residence settings such as a store, a factory, or an office. Furthermore, the application of the power-converting device 1 is not limited to the power conditioner 20, and the power-converting device 1 may be applied to devices other than the power conditioner 20.

Configuration of Power-converting Device

The power-converting device 1 of the present embodiment is electrically connected to the DC power supply 100, as shown in FIG. 1. Here, since the DC power supply 100 is constituted by a solar power generator, the power-converting device 1 is connected to the DC power supply 100 via a junction box.

The power-converting device 1 of the present embodiment further includes a filter circuit 5, a first detector 21, and a second detector 22, in addition to the conversion circuit (first conversion circuit 11, second conversion circuit 12, first bi-directional switch 13, and second bi-directional switch 14) 10, the controller 6, and the generation unit 3.

The first input point 101 and the second input point 102 forms a pair of input terminals in the power-converting device 1, and the DC power supply 100 is electrically connected between the pair of input terminals (first input point 101 and second input point 102).

Also, the first output point 103 of the first conversion circuit 11 and the second output point 104 of the second conversion circuit 12 are respectively electrically connected to the third output point 105 and the fourth output point 106 via the filter circuit 5. In the present embodiment, the third output point 105 and fourth output point 106 form a pair of output terminals in the power-converting device 1. Hereinafter, a first output voltage V10 to be generated between the third output point 105 and the fourth output point 106 will be simply referred to as an "output voltage V10" as well.

In the present embodiment, the output voltage V10 of the power-converting device 1 is an AC voltage, and the third output point 105 and the fourth output point 106 are electrically connected to a utility grid (commercial power network) 7. Furthermore, a load 8 that is supplied with AC power so as to operate is electrically connected to the third output point 105 and the fourth output point 106.

Specifically, the pair of output terminals of the power-converting device 1 is electrically connected to an interconnection breaker provided in a distribution board, and thereby connected to the load 8 and the utility grid 7. That is, the power-converting device 1 converts DC power that is received from the DC power supply 100 to AC power, and outputs the AC power to the load 8 and the utility grid 7 via the pair of output terminals (third output point 105 and fourth output point 106). Note that, although the utility grid 7 is a single-phase three-wire system having a U phase and a W phase, in FIG. 1, the utility grid 7 is not limited to this example and may be a single-phase two-wire system.

Next, the configuration of units of the power-converting device 1 will be described in detail.

In the power-converting device 1, among the pair of input terminals that are connected to the DC power supply 100, an input terminal on the high potential (positive electrode) side of the DC power supply 100 is the first input point 101, and an input terminal on the low potential (negative electrode) side of the DC power supply 100 is the second input point 102. Therefore, a DC voltage that is output from the DC power supply 100 is applied between the first input point 101 and the second input point 102 as the input voltage.

Here, the input terminal (second input point 102) on the low potential side of the DC power supply 100 is a circuit ground of the power-converting device 1, and the potential thereof is assumed to be 0 [V]. Thus, based on a DC voltage E [V] that is an output from the DC power supply 100, the potential of the first input point 101 is expressed as E [V].

The first conversion circuit 11 includes the first to fourth switching elements Q1 to Q4 connected in series between the first input point 101 and the second input point 102 and the first capacitor C1, as described above. Here, a depletion type n-channel MOSFET (Metal-Oxide-Semiconductor Field Effect Transistor) is employed as each of the first to fourth switching elements Q1 to Q4, as an example.

A drain of the first switching element Q1 is electrically connected to the first input point 101. A drain of the second switching element Q2 is electrically connected to a source of the first switching element Q1. A drain of the third switching element Q3 is electrically connected to a source of the second switching element Q2. A drain of the fourth switching element Q4 is electrically connected to a source of the third switching element Q3. Furthermore, a source of the fourth switching element Q4 is electrically connected to the second input point 102.

Here, the connection point of the source of the second switching element Q2 and the drain of the third switching element Q3 is the first output point 103. Furthermore, the connection point of the source of the first switching element Q1 and the drain of the second switching element Q2 is the first connection point 201. The connection point between the source of the third switching element Q3 and the drain of the fourth switching element Q4 is the third connection point 203.

The first capacitor C1 has one end electrically connected to the drain of the second switching element Q2 (first connection point 201) and another end electrically connected to the source of the third switching element Q3 (third connection point 203). In other words, the first capacitor C1 has one end that is electrically connected to the first input point 101 via the first switching element Q1, and the other end that is electrically connected to the second input point 102 via the fourth switching element Q4.

The second conversion circuit 12 includes the fifth to eighth switching elements Q5 to Q8 connected in series between the first input point 101 and the second input point 102 and the second capacitor C2, as described above. Here, the second conversion circuit 12 has basically the same configuration as the first conversion circuit 11, the fifth to eighth switching elements Q5 to Q8 correspond to the first to fourth switching elements Q1 to Q4, and the second capacitor C2 corresponds to the first capacitor C1. Here, a depletion type n-channel MOSFET is employed as each of the fifth to eighth switching elements Q5 to Q8, similarly to the first to fourth switching elements Q1 to Q4.

That is, a drain of the fifth switching element Q5 is electrically connected to the first input point 101. A drain of the sixth switching element Q6 is electrically connected to a source of the fifth switching element Q5. A drain of the seventh switching element Q7 is electrically connected to a source of the sixth switching element Q6. A drain of the eighth switching element Q8 is electrically connected to a source of the seventh switching element Q7. Furthermore, a source of the eighth switching element Q8 is electrically connected to the second input point 102.

Here, the connection point of the source of the sixth switching element Q6 and the drain of the seventh switching element Q7 is the second output point 104. Furthermore, the connection point of the source of the fifth switching element Q5 and the drain of the sixth switching element Q6 is the fourth connection point 204. A connection point of the source of the seventh switching element Q7 and the drain of the eighth switching element Q8 is the second connection point 202.

The second capacitor C2 has one end electrically connected to the drain of the sixth switching element Q6 (fourth connection point 204) and another end electrically connected to the source of the seventh switching element Q7 (second connection point 202). In other words, the second capacitor C2 has one end that is electrically connected to the first input point 101 via the fifth switching element Q5 and the other end that is electrically connected to the second input point 102 via the eighth switching element Q8.

The circuit constant (capacitance) of the second capacitor C2 is the same as the circuit constant (capacitance) of the first capacitor C1.

Also, in FIG. 1, first to eighth diodes D1 to D8 are respectively connected in anti-parallel to the first to eighth switching elements Q1 to Q8 in one-to-one correspondence. These first to eighth diodes D1 to D8 are parasitic diodes of the respective first to eighth switching elements Q1 to Q8. That is, the parasitic diode of the first switching element Q1 constitutes the first diode D1, similarly, the parasitic diodes of the second, third, etc. switching elements Q2, Q3, etc. respectively constitute the second, third, etc. diodes D2, D3, etc. For example, the first diode D1 is connected in a direction such that its own cathode is on the drain side of the first switching element Q1 and its own anode is on the source side.

The first conversion circuit 11 and the second conversion circuit 12 configured in this way are electrically connected in parallel between the first input point 101 and the second input point 102. That is, the first conversion circuit 11 and the second conversion circuit 12 are connected in parallel between two terminals of the DC power supply 100.

The first bi-directional switch 13 is electrically connected between the first connection point 201 and the second connection point 202. That is, the first connection point 201 of the first conversion circuit 11 is electrically connected to the second connection point 202 of the second conversion circuit 12 via the first bi-directional switch 13. Here, the first bi-directional switch 13 includes a ninth switching element Q9 and a tenth switching element Q10 that are electrically connected in series between the first connection point 201 and the second connection point 202. In the first bi-directional switch 13, the ninth switching element Q9 and the tenth switching element Q10 are connected in the stated order from the first connection point 201 side.

Specifically, a depletion type n-channel MOSFET is employed as each of the ninth and tenth switching elements Q9 and Q10, similarly to each of the first to eighth switching elements Q1 to Q8. A source of the ninth switching element Q9 is connected to the first connection point 201, and a drain of the ninth switching element Q9 is connected to a drain of the tenth switching element Q10. A source of the tenth switching element Q10 is connected to the second connection point 202. In short, the ninth switching element Q9 and the tenth switching element Q10 are connected in anti-series between the first connection point 201 and the second connection point 202 such that the drains thereof are connected to each other.

The second bi-directional switch 14 is electrically connected between the third connection point 203 and the fourth connection point 204. That is, the third connection point 203 of the first conversion circuit 11 is electrically connected to the fourth connection point 204 of the second conversion circuit 12 via the second bi-directional switch 14. Here, the second bi-directional switch 14 includes a twelfth switching element Q12 and an eleventh switching element Q11 that are electrically connected in series between the third connection point 203 and the fourth connection point 204. In the second bi-directional switch 14, the twelfth switching element Q12 and the eleventh switching element Q11 are connected in the stated order from the third connection point 203 side.

Specifically, a depletion type n-channel MOSFET is employed as each of the eleventh and twelfth switching elements Q11 and Q12, similarly to each of the first to eighth switching elements Q1 to Q8. A source of the eleventh switching element Q11 is connected to the fourth connection point 204, and a drain of the eleventh switching element Q11 is connected to a drain of the twelfth switching element Q12. A source of the twelfth switching element Q12 is connected to the third connection point 203. In short, the eleventh switching element Q11 and the twelfth switching element Q12 are connected in anti-series between the third connection point 203 and the fourth connection point 204 such that the drains thereof are connected to each other.

Also, ninth to twelfth diodes D9 to D12 are respectively connected in anti-parallel to the ninth to twelfth switching elements Q9 to Q12 in one-to-one correspondence. These ninth to twelfth diodes D9 to D12 are parasitic diodes of the respective ninth to twelfth switching elements Q9 to Q12. That is, the parasitic diode of the ninth switching element Q9 constitutes the ninth diode D9, and similarly, the parasitic diodes of the tenth, eleventh and twelfth switching elements Q10, Q11, and Q12 respectively constitute the tenth, eleventh, and twelfth diodes D10, D11, and D12. For example, the ninth diode D9 is connected orientated such that its own cathode is on the drain side of the ninth switching element Q9 and its own anode is on the source side.

In the present embodiment, the first bi-directional switch 13 is configured to be able to switch between operating states that include an all-off state and an all-on state. The all-off state of the first bi-directional switch 13 is a state in which currents in both directions are cut off between the first connection point 201 and the second connection point 202. The all-on state of the first bi-directional switch 13 is a state in which currents in both directions are allowed to pass between the first connection point 201 and the second connection point 202. Similarly, the second bi-directional switch 14 is configured to be able to switch between operating states that include an all-off state and an all-on state. The all-off state of the second bi-directional switch 14 is a state in which currents in both directions are cut off between the third connection point 203 and the fourth connection point 204. The all-on state of the second bi-directional switch 14 is a state in which currents in both directions are allowed to pass between the third connection point 203 and the fourth connection point 204.

Furthermore, in the present embodiment, the operating states of the first bi-directional switch 13 further includes a half-on state in which a current that flows from the second connection point 202 to the first connection point 201 is cut off, and a current that flows from the first connection point 201 to the second connection point 202 is allowed to pass. Also, the operating states of the second bi-directional switch 14 further include a half-on state in which a current that flows from the third connection point 203 to the fourth connection point 204 is cut off, and a current that flows from the fourth connection point 204 to the third connection point 203 is allowed to pass.

Therefore, in the power-converting device 1 of the present embodiment, by putting the first bi-directional switch 13 in the all-on state, a state can be realized in which currents in both directions can pass between the first connection point 201 and the second connection point 202. Also, in the power-converting device 1 of the present embodiment, by putting the second bi-directional switch 14 in the all-on state, a state can be realized in which currents in both directions can pass between the third connection point 203 and the fourth connection point 204.

That is, the first bi-directional switch 13 enters the all-off state in a state in which the ninth and tenth switching elements Q9 and Q10 are both in an off state, and enters the all-on state in a state in which the ninth and tenth switching elements Q9 and Q10 are both in an on state. Furthermore, the first bi-directional switch 13 enters the half-on state in which the current direction is limited to one direction by the ninth diode D9 in a state in which the tenth switching element Q10 is on, and the ninth switching element Q9 is off.

Also, the second bi-directional switch 14 enters the all-off state in a state in which the eleventh and twelfth switching elements Q11 and Q12 are both in an off state, and enters the all-on state in a state in which the eleventh and twelfth switching elements Q11 and Q12 are both in an on state. Furthermore, the second bi-directional switch 14 enters the half-on state in which the current direction is limited to one direction by the eleventh diode D11 in a state in which the twelfth switching element Q12 is on and the eleventh switching element Q11 is off.

In this way, the bi-directional switch (each of the first bi-directional switch 13 and the second bi-directional switch 14) in the present embodiment can switch between three operating states constituted by the all-off state, the all-on state, and the half-on state.

Describing the above configuration differently, the first bi-directional switch 13 is electrically connected between a terminal of the first capacitor C1 on a positive electrode side thereof and a terminal of the second capacitor C2 on a negative electrode side thereof. The second bi-directional switch 14 is electrically connected between a terminal of the first capacitor C1 on a negative electrode side thereof and a terminal of the second capacitor C2 on a positive electrode side thereof. That is, the first capacitor C1 of the first conversion circuit 11 and the second capacitor C2 of the second conversion circuit 12 are connected crosswise via the first bi-directional switch 13 and the second bi-directional switch 14.

Furthermore, the gates of the first to eighth switching elements Q1 to Q8 and the ninth to twelfth switching elements Q9 to Q12 are each electrically connected to the controller 6. The controller 6 can switch on and off of the first to fourth switching elements Q1 to Q4 individually, and thereby controls the first conversion circuit 11. Also, the controller 6 can switch on and off of the fifth to eighth switching elements Q5 to Q8 individually, and thereby controls the second conversion circuit 12. Also, the controller 6 can switch on and off of the ninth and tenth switching elements Q9 and Q10 individually, and thereby controls the first bi-directional switch 13. Also, the controller 6 can switch on and off of the eleventh and twelfth switching elements Q11 and Q12 individually, and thereby controls the second bi-directional switch 14.

Note that the controller 6 may be separately provided to each of the first conversion circuit 11, the second conversion circuit 12, the first bi-directional switch 13, and the second bi-directional switch 14.

In the present embodiment, the controller 6 includes a drive circuit 61 that applies drive signals to the first to twelfth switching elements Q1 to Q12, and a microcomputer 62 that applies signals to the drive circuit 61.

The drive circuit 61 is configured to drive (control) the first to twelfth switching elements Q1 to Q12 individually by applying respective drive signals to the control terminals (gates) thereof. The microcomputer 62 is configured to control the drive circuit 61 by applying a PWM (Pulse Width Modulation) signal to the drive circuit 61. That is, the controller 6 controls the first to twelfth switching elements Q1 to Q12 individually by the drive signals generated by the drive circuit 61 according to the instruction from the microcomputer 62.

Here, the drive circuit 61 preferably also includes a function serving as a short-circuit prevention circuit that prevents a short-circuit current from flowing due to two or more switching elements being turned on at the same time. That is, when a specific combination of switching elements turn on at the same time, it is possible that the first input point 101 and the second input point 102 will be short-circuited, for example, and a current from the DC power supply 100 will flow through the switching elements as a short-circuit current. Therefore, the drive circuit 61 is preferably configured such that such a specific combination of switching elements are not turned on at the same time. For example, the drive circuit 61 is configured such that when drive signals that are to be input to the specific combination of switching elements become a high level at the same time, the drive signals are forcibly set to a low level, and as a result, the specific combination of the switching elements are not to be turned on at the same time.

The generation unit 3 generates a reference wave constituted by at least one carrier wave. In the present embodiment, a triangular wave is exemplified as the carrier wave. Therefore, the generation unit 3 is constituted by a triangular wave oscillator. The reference wave (one or more carrier waves) generated by the generation unit 3 is outputted to the microcomputer 62 in the controller 6. The microcomputer 62 generates a PWM signal. That is, the microcomputer 62 generates the PWM signal by a triangular wave comparison method in which a reference wave which is a triangular wave, and a signal wave based on a target value of the output voltage V20 (or first output voltage V10) are compared. Since the power-converting device 1 of the present embodiment is applied for the power conditioner 20 (refer to FIG. 7) as described above, the signal wave based on the target value of the output voltage V10 has a waveform based on a sine wave that is the same as that of the utility grid 7. Specific examples of the reference wave, and details of the generation method of the PWM signal will be described later.

Note that the generation of the PWM signal can be realized if at least a function of generating the reference wave and a function of comparing the reference wave with the signal wave are included. Therefore, although the generation unit 3 that generates the reference wave is provided separately from the microcomputer 62 that generates the PWM signal in the present embodiment, the generation unit 3 may be incorporated in the controller (microcomputer 62) 6. Also, the controller 6 may be configured to generate the PWM signal by performing comparison between the signal wave and the reference wave through a comparator instead of the microcomputer 62.

The filter circuit 5 includes a pair of inductors L1 and L2 and a third capacitor C3, as shown in FIG. 1. One inductor L1 is electrically connected between the first output point 103 and the third output point 105. The other inductor L2 is electrically connected between the second output point 104 and the fourth output point 106. Note that it is sufficient that the inductors L1 and L2 are electrically connected between at least one of the first and second output points 103 and 104 and the output terminal (third output point 105, fourth output point 106), and one of the inductors L1 and L2 may be omitted. That is, it is sufficient that only the inductor L1 is electrically connected between the first output point 103 and the third output point 105, or only the inductor L2 is electrically connected between the second output point 104 and the fourth output point 106.

The third capacitor C3 is electrically connected between the third output point 105 and the fourth output point 106. In other words, the filter circuit 5 is a series circuit of the inductor L1, the third capacitor C3, and the inductor L2 that are electrically connected between the first output point 103 and the second output point 104.

The first detector 21 is configured to detect the voltage of the first capacitor C1. Here, the first detector 21 detects (measures) the magnitude of the voltage V1 generated across the first capacitor C1 with a positive electrode being on the first connection point 201 side. The first detector 21 is configured by a pair of voltage dividing resistors that are connected in series between the first connection point 201 and the third connection point 203, for example. Note that the configuration of the first detector 21 is not limited thereto, and it is sufficient that the first detector 21 is configured to detect a value (magnitude) of the voltage (voltage of the first capacitor C1) V1 generated across the first capacitor C1. The first detector 21 outputs the value of the voltage V1, which is a detection result, to the microcomputer 62 in the controller 6.

The second detector 22 is configured to detect the voltage of the second capacitor C2. Here, the second detector 22 detects (measures) a magnitude of the voltage V2 generated across the second capacitor C2 with a positive electrode being on the fourth connection point 204 side. The second detector 22 is configured by a pair of voltage dividing resistors that are connected in series between the fourth connection point 204 and the second connection point 202, for example. Note that the configuration of the second detector 22 is not limited thereto, and it is sufficient that the second detector 22 is configured to detect the value (magnitude) of the voltage (voltage of the second capacitor C2) V2 generated across the second capacitor C2. The second detector 22 outputs the value of the voltage V2, which is a detection result, to the microcomputer 62 in the controller 6.

In the present embodiment, the detection circuit that detects (measures) the voltage across the capacitor (first capacitor C1 and second capacitor C2) is constituted by the first detector 21 and the second detector 22. Furthermore, while a detailed description will be given later, the detection result of the detection circuit, that is, the voltage of the capacitor that is detected by the detection circuit is an average value of the detection result (voltage V1 of the first capacitor C1) of the first detector 21 and the detection result (voltage V2 of the second capacitor C2) of the second detector 22. The operation of the controller 6 based on the detection results of the first detector 21 and the second detector 22 will be described later.

Basic Operation of Power-converting Device

A basic operation of the power-converting device 1 having the configuration described above will be briefly described with reference to FIGS. 2A, 2B, 3A, 3B, 4A, 4B, 5A, and 5B. Note that, in the drawings, thick line arrows indicate current paths, and switching elements marked by dotted circles are elements that are in an on state.

The basic operation of the power-converting device 1 mentioned here refers to an operation of the power-converting device 1 after a period (hereinafter referred to as a "start-up period") has passed in which the first capacitor C1 and the second capacitor C2 are charged to reference voltages after the supply of power from the DC power supply 100 has started. That is, the basic operation of the power-converting device 1 is an operation of the power-converting device 1 after a state in which the first capacitor C1 and the second capacitor C2 are charged to the reference voltages has been realized.

The reference voltage for the first capacitor C1 is a voltage having a magnitude that is a quarter of the applied voltage applied by the DC power supply 100 between the first input point 101 and the second input point 102. The reference voltage of the second capacitor C2 is, similarly, a voltage having a magnitude that is a quarter of the applied voltage applied by the DC power supply 100 between the first input point 101 and the second input point 102.

Hereinafter, it is assumed that the output voltage of the DC power supply 100 is E [V], the potential of the first input point 101 is E [V], and the potential of the second input point 102 is 0 [V]. Here, the voltages across the first capacitor C1 and the second capacitor C2 that have been charged to the reference voltages are each E/4 [V]. Hereinafter, a description will be given in which the potential difference between the first output point 103 and the second output point 104, that is, the voltage generated between the first output point 103 and the second output point 104 is referred to as a second output voltage V20. The second output voltage V20 may also be simply referred to as "output voltage V20".

Note that because the third output point 105 and the fourth output point 106 are electrically connected to the utility grid 7, the potential difference between the third output point 105 and the fourth output point 106, that is, the first output voltage V10 generated between the third output point 105 and the fourth output point 106, is equal to the output voltage of the utility grid 7. The potential difference between the first output point 103 and the third output point 105 and the potential difference between the second output point 104 and the fourth output point 106 are to be absorbed by the filter circuit 5.

The power-converting device 1 switches the operation mode of the first conversion circuit 11, the second conversion circuit 12, the first bi-directional switch 13, and the second bi-directional switch 14 between eight modes, namely first to eighth modes. As a result, the power-converting device 1 converts the DC voltage (E [V]) applied between the first input point 101 and the second input point 102 to an AC voltage, and generates the output voltage V20 between the first output point 103 and the second output point 104. Note that, in the following description, in the case where the on and off states of the first to twelfth switching elements Q1 to Q12 are not mentioned, the switching elements that are not mentioned are assumed to be in an "off" state. Also, a voltage drop in each of the first to twelfth switching elements Q1 to Q12 and a voltage drop in each of the first to twelfth diodes D1 to D12 are assumed to be that of a negligible degree.

Here, the controller 6 controls the first to twelfth switching elements Q1 to Q12 in accordance with the following two conditions.

The first condition is that the first to fourth switching elements Q1 to Q4 in the first conversion circuit 11 respectively form pairs with the fifth to eighth switching elements Q5 to Q8 in the second conversion circuit 12 in one-to-one correspondence, and on and off of the switching elements are to be switched in the units of the pairs. Here, the first and eighth switching elements Q1 and Q8 form a pair, the second and seventh switching elements Q2 and Q7 form a pair, the third and sixth switching elements Q3 and Q6 form a pair, and the fourth and fifth switching elements Q4 and Q5 form a pair.

The second condition is that the second switching element Q2 and the third switching element Q3 are not simultaneously on or off. Furthermore, the first switching element Q1 and the eleventh switching element Q11 are not simultaneously on or off in the first to fourth modes, and the fourth switching element Q4 and the ninth switching element Q9 are not simultaneously on or off in the fifth to eighth modes.

Figure 2A:
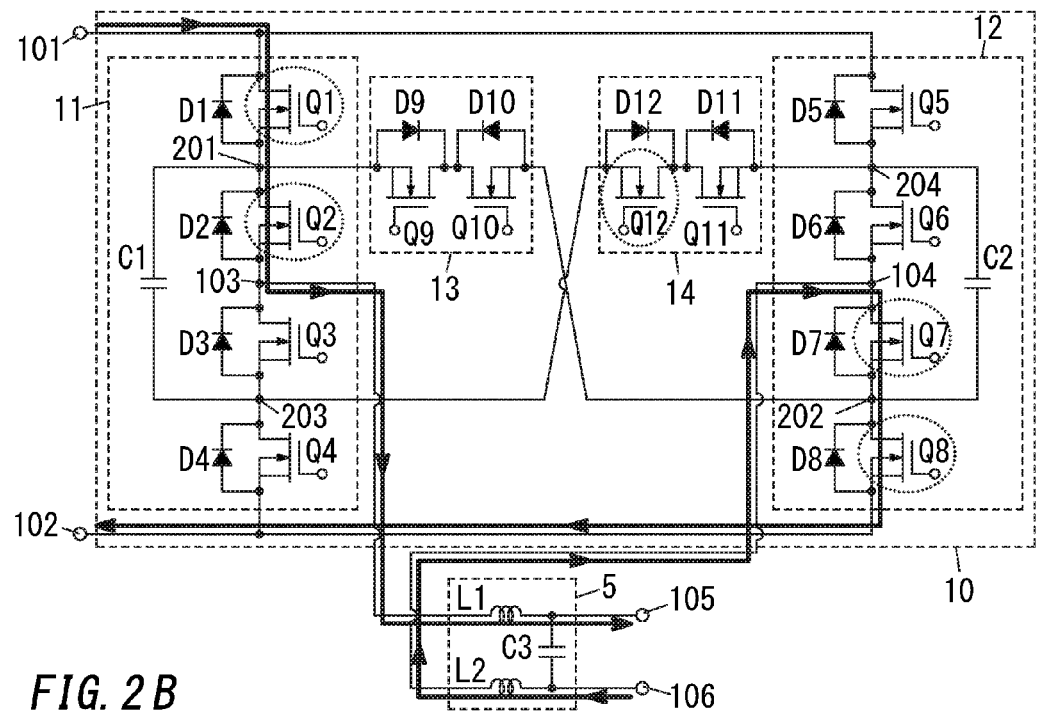
FIG. 2A is a diagram for describing a first mode of the power-converting device according to Embodiment 1.

First, in the first mode shown in FIG. 2A, the first and second switching elements Q1 and Q2 in the first conversion circuit 11, the seventh and eighth switching elements Q7 and Q8 in the second conversion circuit 12, and the twelfth switching element Q12 in the second bi-directional switch 14 are each in an on state. That is, the second bi-directional switch 14 is in a half-on state. In this state, as shown in FIG. 2A, the first input point 101 is electrically connected to the first output point 103 via the first switching element Q1 and the second switching element Q2. Also, the second input point 102 is electrically connected to the second output point 104 via the eighth switching element Q8 and the seventh switching element Q7. At this time, the elements among the semiconductor elements (switching elements, diodes) through which a current flows are four switching elements in total, namely the first, second, seventh, and eighth switching elements Q1, Q2, Q7, and Q8, and no current flows through the twelfth switching element Q12.

Accordingly, the first output point 103 has the same potential (E [V]) as the first input point 101, and the second output point 104 has the same potential (0 [V]) as the second input point 102. Therefore, the output voltage V20 of the power-converting device 1 generated between the first output point 103 and the second output point 104 is E (=E−0) [V]. Furthermore, at this time, the potential of the third output point 105 is a potential that results from subtracting the voltage across the inductor L1 from the potential of the first output point 103, and the potential of the fourth output point 106 is a potential that results from adding the voltage across the inductor L2 to the potential of the second output point 104.

Figure 2B:
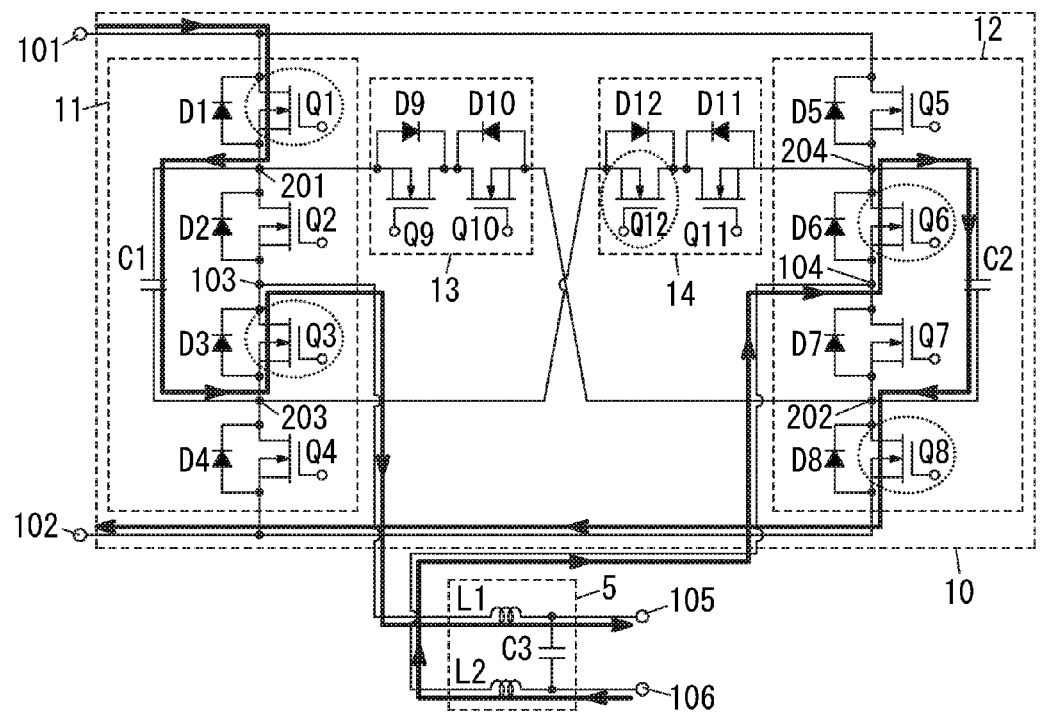
FIG. 2B is a diagram for describing a second mode of the power-converting device according to Embodiment 1.

Next, in the second mode shown in FIG. 2B, the first and third switching elements Q1 and Q3 in the first conversion circuit 11, the sixth and eighth switching elements Q6 and Q8 in the second conversion circuit 12, and the twelfth switching element Q12 in the second bi-directional switch 14 are each in an on state. That is, the second bi-directional switch 14 is in a half-on state. In this state, as shown in FIG. 2B, the first input point 101 is electrically connected to the first output point 103 via the first switching element Q1, the first capacitor C1, and the third switching element Q3. Also, the second input point 102 is electrically connected to the second output point 104 via the eighth switching element Q8, the second capacitor C2, and the sixth switching element Q6. At this time, the elements among the semiconductor elements (switching elements, diodes) through which a current flows are four switching elements in total, namely the first, third, sixth, and eighth switching elements Q1, Q3, Q6, and Q8, and no current flows through the twelfth switching element Q12.

Accordingly, the potential of the first output point 103 is a potential that is lower than the potential (E [V]) of the first input point 101 by the voltage (E/4 [V]) across the first capacitor C1, that is, 3E/4 (=E−E/4) [V]. Also, the potential of the second output point 104 is a potential that is higher than the potential (0 [V]) of the second input point 102 by the voltage (E/4 [V]) across the second capacitor C2, that is, E/4 (=0+E/4) [V]. Therefore, the output voltage V20 of the power-converting device 1 generated between the first output point 103 and the second output point 104 is E/2 (=3E/4−E/4) [V]. Furthermore, at this time, the potential of the third output point 105 is a potential that results from subtracting the voltage across the inductor L1 from the potential of the first output point 103, and the potential of the fourth output point 106 is a potential that results from adding the voltage across the inductor L2 to the potential of the second output point 104.

Figure 3A:
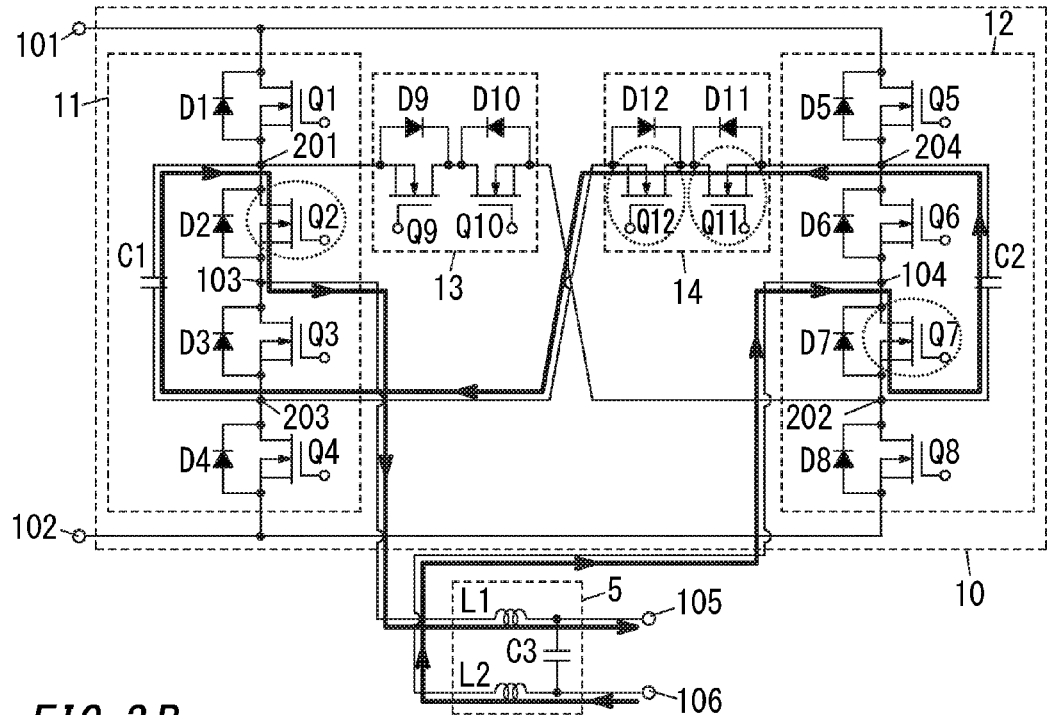
FIG. 3A is a diagram for describing a third mode of the power-converting device according to Embodiment 1.

Next, in the third mode shown in FIG. 3A, the second switching element Q2 in the first conversion circuit 11, the seventh switching element Q7 in the second conversion circuit 12, and the eleventh and twelfth switching elements Q11 and Q12 in the second bi-directional switch 14 are each in an on state. That is, the second bi-directional switch 14 is in an all-on state. In this state, the second output point 104 is electrically connected to the first output point 103 via the seventh switching element Q7, the second capacitor C2, the eleventh switching element Q11, the twelfth switching element Q12, the first capacitor C1, and the second switching element Q2. At this time, the elements among the semiconductor elements (switching elements, diodes) through which a current flows are four switching elements in total, namely the second, seventh, eleventh, and twelfth switching elements Q2, Q7, Q11, and Q12.

Accordingly, the potential of the first output point 103 is a potential that is higher than the potential of the second output point 104 by the sum of the voltage (E/4 [\]) across the first capacitor C1 and the voltage (E/4 [V]) across the second capacitor C2. Therefore, the output voltage V20 of the power-converting device 1 generated between the first output point 103 and the second output point 104 is E/2 (=E/4+E/4) [V]. Furthermore, at this time, the potential of the third output point 105 is a potential that results from subtracting the voltage across the inductor L1 from the potential of the first output point 103, and the potential of the fourth output point 106 is a potential that results from adding the voltage across the inductor L2 to the potential of the second output point 104. Also, in this state, since the second bi-directional switch 14 is in an all-on state, the conversion circuit 10 allows currents in both directions to flow between the first output point 103 and the second output point 104.

Figure 3B:
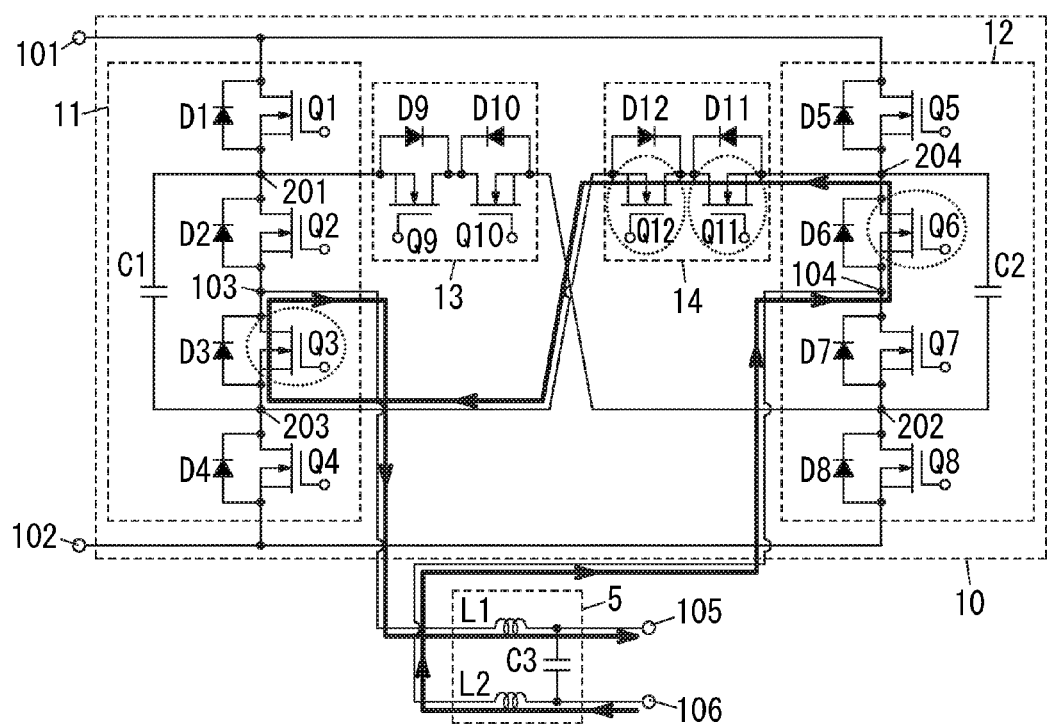
FIG. 3B is a diagram for describing a fourth mode of the power-converting device according to Embodiment 1.

Next, in the fourth mode shown in FIG. 3B, the third switching element Q3 in the first conversion circuit 11, the sixth switching element Q6 in the second conversion circuit 12, and the eleventh and twelfth switching elements Q11 and Q12 in the second bi-directional switch 14 are each in an on state. That is, the second bi-directional switch 14 is in an all-on state. In this state, the second output point 104 is electrically connected to the first output point 103 via the sixth switching element Q6, the eleventh switching element Q11, the twelfth switching element Q12, and the third switching element Q3. At this time, the elements among the semiconductor elements (switching elements, diodes) through which a current flows are four switching elements in total, namely the third, sixth, eleventh, and twelfth switching elements Q3, Q6, Q11, and Q12.

Accordingly, the potential of the first output point 103 is equal to the potential of the second output point 104. Therefore, the output voltage V20 of the power-converting device 1 generated between the first output point 103 and the second output point 104 is 0 [V]. Furthermore, at this time, the potential of the third output point 105 is a potential that results from subtracting the voltage across the inductor L1 from the potential of the first output point 103, and the potential of the fourth output point 106 is a potential that results from adding the voltage across the inductor L2 to the potential of the second output point 104. Also, in this state, since the second bi-directional switch 14 is in an all-on state, the conversion circuit 10 allows currents in both directions to flow between the first output point 103 and the second output point 104.

Meanwhile, in the fifth to eighth modes, the power-converting device 1 performs operations such that, based on the first to fourth modes, the operation of the first conversion circuit 11 is switched with the operation of the second conversion circuit 12, and the operation of the first bi-directional switch 13 is switched with the operation of the second bi-directional switch 14. That is, the operations of the conversion circuit 10 are symmetrical between those in the fifth to eighth modes and those in the first to fourth modes such that the first conversion circuit 11 and the first bi-directional switch 13 are switched with the second conversion circuit 12 and the second bi-directional switch 14.

Figure 4A:
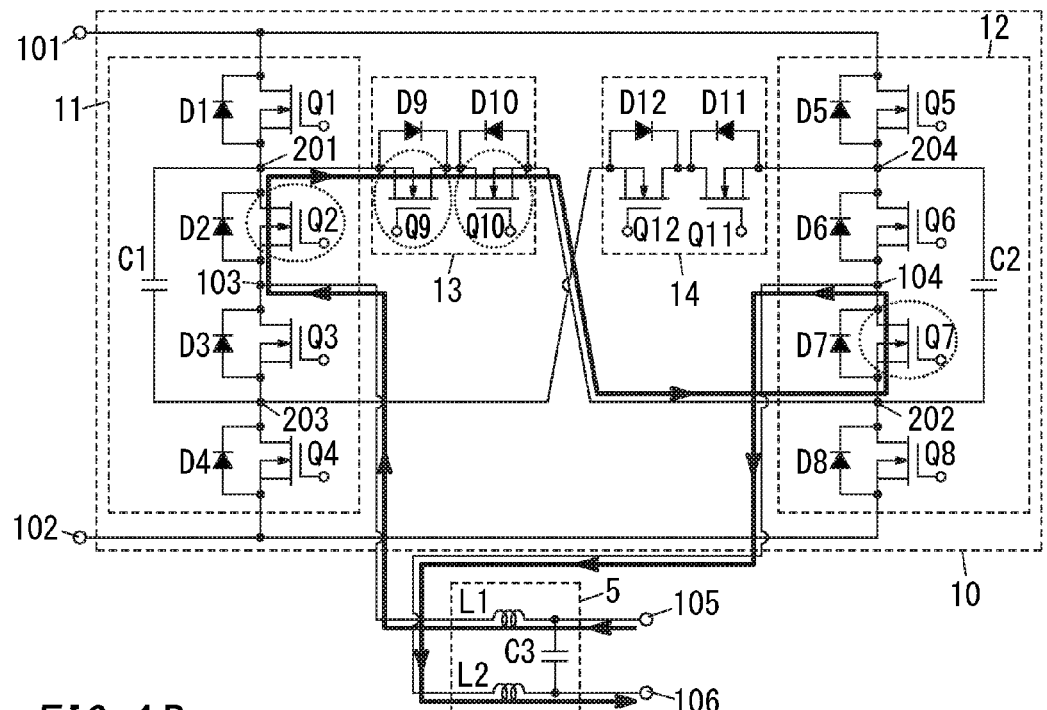
FIG. 4A is a diagram for describing a fifth mode of the power-converting device according to Embodiment 1.

That is, in the fifth mode shown in FIG. 4A, the operation of the conversion circuit 10 is symmetrical with the operation in the fourth mode. Therefore, in the fifth mode, the second switching element Q2 in the first conversion circuit 11, the seventh switching element Q7 in the second conversion circuit 12 and the ninth and tenth switching elements Q9 and Q10 in the first bi-directional switch 13 are each in an on state. That is, the first bi-directional switch 13 is in an all-on state. In this state, as shown in FIG. 4A, the first output point 103 is electrically connected to the second output point 104 via the second switching element Q2, the ninth switching element Q9, the tenth switching element Q10, and the seventh switching element Q7. At this time, the elements among the semiconductor elements (switching elements, diodes) through which a current flows are four switching elements in total, namely the second, seventh, ninth, and tenth switching elements Q2, Q7, Q9, and Q10.

Accordingly, the potential of the first output point 103 is equal to the potential of the second output point 104. Therefore, the output voltage V20 of the power-converting device 1 generated between the first output point 103 and the second output point 104 is 0 [V]. Furthermore, at this time, the potential of the third output point 105 is a potential that results from adding the voltage across the inductor L1 to the potential of the first output point 103, and the potential of the fourth output point 106 is a potential that results from subtracting the voltage across the inductor L2 from the potential of the second output point 104. Also, in this state, since the first bi-directional switch 13 is in an all-on state, the conversion circuit 10 allows currents in both directions to flow between the first output point 103 and the second output point 104.

Figure 4B:
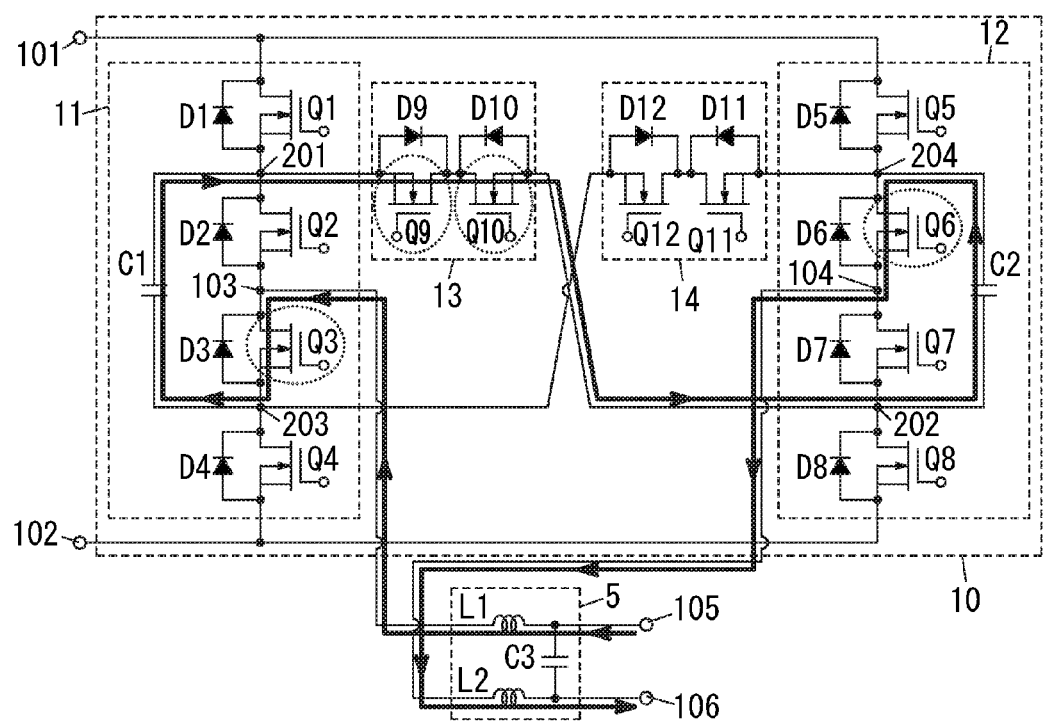
FIG. 4B is a diagram for describing a sixth mode of the power-converting device according to Embodiment 1.

Next, in the sixth mode shown in FIG. 4B, the operation of the conversion circuit 10 is symmetrical with the operation in the third mode. Therefore, in the sixth mode, the third switching element Q3 in the first conversion circuit 11, the sixth switching element Q6 in the second conversion circuit 12, and the ninth and tenth switching elements Q9 and Q10 in the first bi-directional switch 13 are each in an on state. That is, the first bi-directional switch 13 is in an all-on state. In this state, the first output point 103 is electrically connected to the second output point 104 via the third switching element Q3, the first capacitor C1, the ninth switching element Q9, the tenth switching element Q10, the second capacitor C2, and the sixth switching element Q6. At this time, the elements among the semiconductor elements (switching elements, diodes) through which a current flows are four switching elements in total, namely the third, sixth, ninth, and tenth switching elements Q3, Q6, Q9, and Q10.

Accordingly, the potential of the first output point 103 is a potential that is lower than the potential of the second output point 104 by the sum of the voltage (E/4 [V]) across the first capacitor C1 and the voltage (E/4 [V]) across the second capacitor C2. Therefore, the output voltage V20 of the power-converting device 1 generated between the first output point 103 and the second output point 104 is −E/2 (=−E/4−E/4) [V]. Furthermore, at this time, the potential of the third output point 105 is a potential that results from adding the voltage across the inductor L1 to the potential of the first output point 103, and the potential of the fourth output point 106 is a potential that results from subtracting the voltage across the inductor L2 from the potential of the second output point 104. Also, in this state, since the first bi-directional switch 13 is in an all-on state, the conversion circuit 10 allows a current to flow in both directions between the first output point 103 and the second output point 104.

Figure 5A:
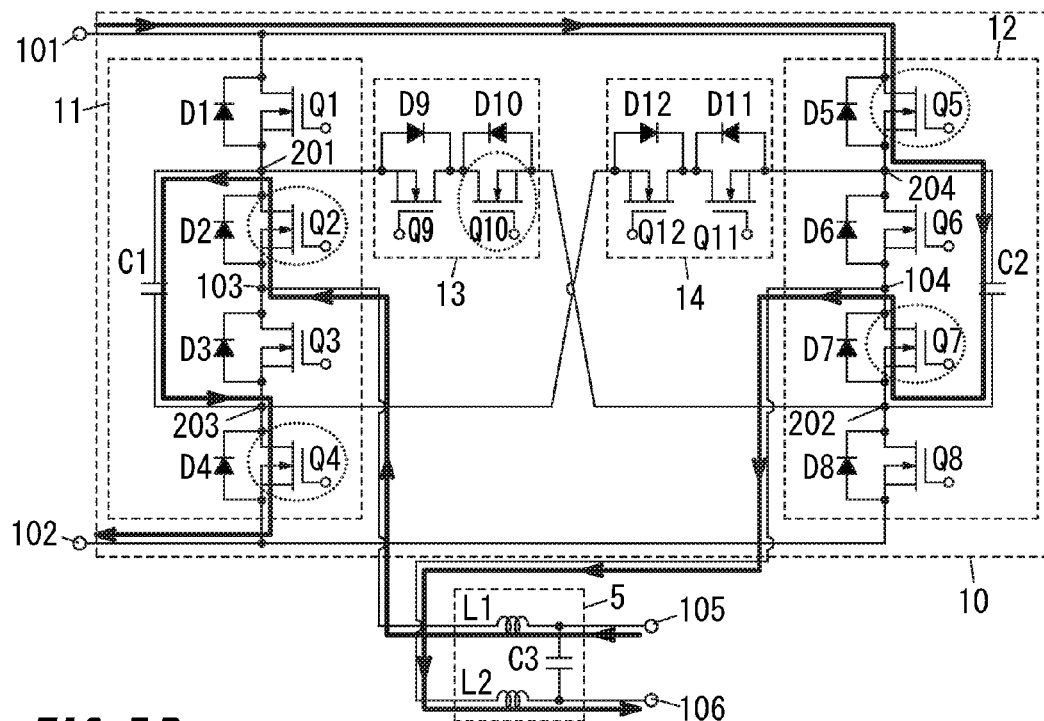
FIG. 5A is a diagram for describing a seventh mode of the power-converting device according to Embodiment 1.

Next, in the seventh mode shown in FIG. 5A, the operation of the conversion circuit 10 is symmetrical with the operation in the second mode. Therefore, in the seventh mode, the second and fourth switching elements Q2 and Q4 in the first conversion circuit 11, the fifth and seventh switching elements Q5 and Q7 in the second conversion circuit 12, and the tenth switching element Q10 in the first bi-directional switch 13 are each in an on state. That is, the first bi-directional switch 13 is in a half-on state. In this state, as shown in FIG. 5A, the first input point 101 is electrically connected to the second output point 104 via the fifth switching element Q5, the second capacitor C2, and the seventh switching element Q7. Also, the second input point 102 is electrically connected to the first output point 103 via the fourth switching element Q4, the first capacitor C1, and the second switching element Q2. At this time, the elements among the semiconductor elements (switching elements, diodes) through which a current flows are four switching elements in total, namely the second, fourth, fifth, and seventh switching elements Q2, Q4, Q5, and Q7, and no current flows through the tenth switching element Q10.

Accordingly, the potential of the first output point 103 is a potential that is higher than the potential (0 [V]) of the second input point 102 by the voltage (E/4 [V]) across the first capacitor C1, that is, E/4 (=0+E/4) [V]. Also, the potential of the second output point 104 is a potential that is lower than the potential (E [V]) of the first input point 101 by the voltage (E/4 [V]) across the second capacitor C2, that is, 3E/4 (=E−E/4) [V]. Therefore, the output voltage V20 of the power-converting device 1 generated between the first output point 103 and the second output point 104 is −E/2 (=E/4−3E/4) [V]. Furthermore, at this time, the potential of the third output point 105 is a potential that results from adding the voltage across the inductor L1 to the potential of the first output point 103, and the potential of the fourth output point 106 is a potential that results from subtracting the voltage across the inductor L2 from the potential of the second output point 104.

Figure 5B:
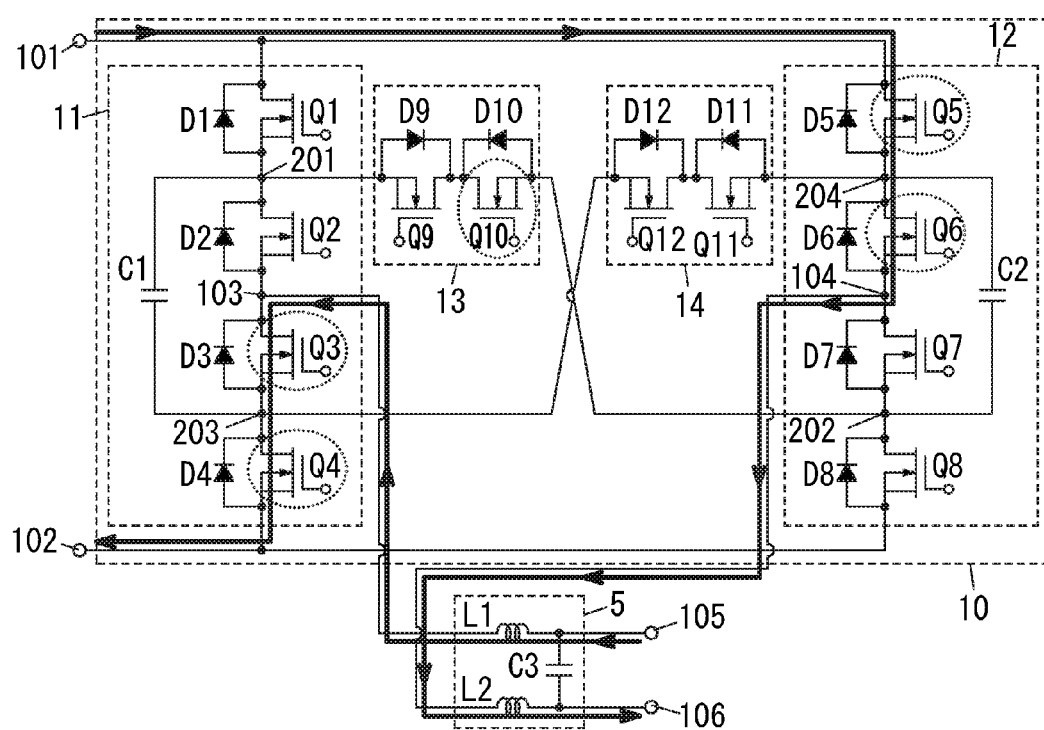
FIG. 5B is a diagram for describing an eighth mode of the power-converting device according to Embodiment 1.

Next, in the eighth mode shown in FIG. 5B, the operation of the conversion circuit 10 is symmetrical with the operation in the first mode. Therefore, in the eighth mode, the third and fourth switching elements Q3 and Q4 in the first conversion circuit 11, the fifth and sixth switching elements Q5 and Q6 in the second conversion circuit 12, and the tenth switching element Q10 in the first bi-directional switch 13 are each in an on state. That is, the first bi-directional switch 13 is in a half-on state. In this state, as shown in FIG. 5B, the first input point 101 is electrically connected to the second output point 104 via the fifth switching element Q5 and the sixth switching element Q6. Also, the second input point 102 is electrically connected to the first output point 103 via the fourth switching element Q4 and the third switching element Q3. At this time, the elements among the semiconductor elements (switching elements, diodes) through which a current flows are four switching elements in total, namely the third, fourth, fifth, and sixth switching elements Q3, Q4, Q5, and Q6, and no current flows through the tenth switching element Q10.

Accordingly, the first output point 103 has the same potential (0 [V]) as the second input point 102, and the second output point 104 has the same potential (E [V]) as the first input point 101. Therefore, the output voltage V20 of the power-converting device 1 generated between the first output point 103 and the second output point 104 becomes −E (=0−E) [V]. Furthermore, at this time, the potential of the third output point 105 becomes a potential that results from adding the voltage across the inductor L1 to the potential of the first output point 103, and the potential of the fourth output point 106 becomes a potential that results from subtracting the voltage across the inductor L2 from the potential of the second output point 104.

In short, the power-converting device 1 changes the magnitude of the output voltage V20 to be generated between the first output point 103 and the second output point 104 in multi-levels by switching between the first to eighth modes.

More specifically, the first conversion circuit 11 employs the first capacitor C1 as a flying capacitor, and switches the potential of the first output point 103 by switching on and off of the first to fourth and ninth to twelfth switching elements Q1 to Q4 and Q9 to Q12. Note that, although the first capacitor C1 is charged in the second and seventh modes, and is discharged in the third and sixth modes, in principle, if the first to eighth modes are switched at a relatively high frequency, the voltage across the first capacitor C1 in the basic operation can be regarded as substantially constant (E/4 [V]).

Also, the second conversion circuit 12 employs the second capacitor C2 as a flying capacitor, and switches the potential of the second output point 104 by switching on and off of the fifth to twelfth switching elements Q5 to Q12. Note that, although the second capacitor C2 is charged in the second and seventh modes, and is discharged in the third and sixth modes, in principle, if the first to eighth modes are switched at a relatively high frequency, the voltage across the second capacitor C2 in the basic operation can be regarded as substantially constant (E/4 [V]).

In short, the controller 6 switches between charging and discharging of the capacitor by switching between modes, which form a pair, in which the magnitude of the output voltage V20 is the same and the direction of a current that flows through the capacitor (first capacitor C1 and second capacitor C2) is opposite.

Specifically, in the case where the output voltage V20 is to be E/2 [V], the controller 6 switches between the second mode and the third mode, as a pair of modes, and thus switches between charging and discharging of the capacitor (first capacitor C1 and second capacitor C2). Also, in the case where the output voltage V20 is to be −E/2 [V], the controller 6 switches between the seventh mode and the sixth mode, as a pair of modes, and thus switches between charging and discharging of the capacitor (first capacitor C1 and second capacitor C2).

Here, since the modes in which the first capacitor C1 and the second capacitor C2 are charged are, in principle, the second and the seventh modes, hereinafter, the second mode and the seventh mode will be referred to as a "charging mode" as well. Since the modes in which the first capacitor C1 and the second capacitor C2 are discharged are, in principle, the third and sixth modes, hereinafter, the third mode and the sixth mode will be referred to as a "discharging mode" as well. Furthermore, because the modes (first, fourth, fifth, and eighth modes) of the first to eighth modes, other than the charging mode and the discharging mode are modes in which the voltage of the capacitor is sustained without contributing to charging or discharging of the capacitor, and hereinafter, the first, fourth, fifth, and eighth modes will be referred to as a "sustaining mode" as well. Also, hereinafter, it is assumed that, in the case where one of the charging mode and the discharging mode is selected, the controller 6 outputs a "charging instruction" when selecting the charging mode, and outputs a "discharging instruction" when selecting the discharging mode.

That is, in the case of causing the output voltage V20 to be E/2 [V], the controller 6 outputs the charging instruction when charging the capacitor (first capacitor C1 and second capacitor C2), and selects the second mode, which is a charging mode. In the case of causing the output voltage V20 to be E/2 [V], the controller 6 outputs the discharging instruction when discharging the capacitor (first capacitor C1 and second capacitor C2), and selects the third mode, which is a discharging mode.

Similarly, in the case of causing the output voltage V20 to be −E/2 [V], the controller 6 outputs the charging instruction when charging the capacitor (first capacitor C1 and second capacitor C2), and selects the seventh mode, which is a charging mode. In the case of causing the output voltage V20 to be −E/2 [V], the controller 6 outputs the discharging instruction when discharging the capacitor (first capacitor C1 and second capacitor C2), and selects the sixth mode, which is a discharging mode.

In this way, the controller 6 switches between the charging mode and the discharging mode, as a pair of modes, in which the magnitude of the output voltage V20 is the same and the direction of a current that flows through the capacitor is opposite, and thus switches between charging and discharging of the capacitor. Note that the state in which the capacitor is charged in the charging mode and the capacitor is discharged in the discharging mode is limited to a state in which a later-described forward direction current is flowing in the conversion circuit 10. In the state in which a later-described reverse direction current is flowing in the conversion circuit 10, the capacitor is discharged in the charging mode, and the capacitor is charged in the discharging mode. This point will be described later. Hereinafter, description will be given assuming that the current flowing in the conversion circuit 10 is the forward direction current, unless otherwise specified.

As described above, in the first to eighth modes, the power-converting device 1 outputs a voltage from the first output point 103 and the second output point 104 as the output voltage V20, the first output point 103 being on a high potential side and the second output point 104 being on a low potential side. Also, in the first to fourth modes, the power-converting device 1 switches the output voltage V20 generated between the first output point 103 and the second output point 104 in three levels, namely E [V] (first mode), E/2 [V] (second and third modes), and 0 [V] (fourth mode). In the fifth to eighth modes, the power-converting device 1 switches the output voltage V20 generated between the first output point 103 and the second output point 104 in three levels, namely 0 [V] (fifth mode), −E/2 [V] (sixth and seventh modes), and −E [V] (eighth mode).

Accordingly, the power-converting device 1 can switch the output voltage V20 in five levels, namely E [V], E/2 [V], 0 [V], −E/2 [V], and −E [V], by switching between the first to eighth modes, that is, eight modes in total. The power-converting device 1 generates the first output voltage V10, which is an AC voltage, between the third output point 105 and the fourth output point 106 by appropriately switching the output voltage V20 between these five levels.

Figure 6:
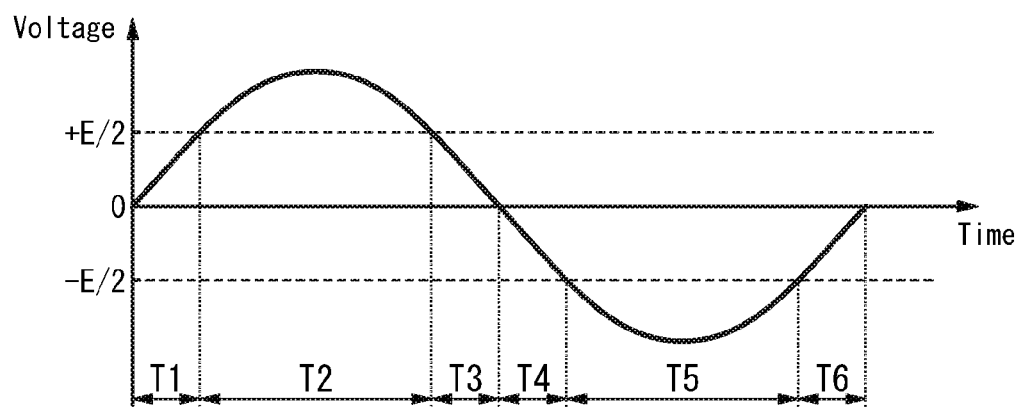
FIG. 6 is a waveform diagram of an output voltage of the power-converting device according to Embodiment 1.

Here, the output voltage V10 is equal to the output voltage of the utility grid 7, and has a sinusoidal waveform, as shown in FIG. 6. In FIG. 6, the horizontal axis is a time axis, and the vertical axis shows the voltage value. Here, in terms T1 to T3 in which the output voltage V10 changes in a range from 0 [V] to E [V] (that is, a period corresponding to a half wave on a positive polarity side in a sine wave), the power-converting device 1 operates by switching between the first to fourth modes. In terms T4 to T6 in which the output voltage V10 changes in a range from 0 [V] to −E [V] (that is, a period corresponding to a half wave on a negative polarity side in a sine wave), the power-converting device 1 operates by switching between the fifth to eighth modes.

The first to eighth modes described above are summarized as shown in TABLE 1.

Furthermore, in the term T2 in which the output voltage V10 changes in a range from E/2 [V] to E [V] in FIG. 6, the controller 6 repeats operations so as to switch between the first to third modes, as shown in TABLE 1. Here, the controller 6 achieves a balance between discharging and charging of the first capacitor C1 and the second capacitor C2 by adjusting the time lengths of the second mode and the third mode.

Also, in the terms T4 and T6 in which the output voltage V10 changes in a range from 0 [V] to −E/2 [V] in FIG. 6, the controller 6 repeats operations so as to switch between the fifth to seventh modes, as shown in TABLE 1. Here, the controller 6 achieves a balance between discharging and charging of the first capacitor C1 and the second capacitor C2 by adjusting the time lengths of the sixth mode and the seventh mode.

Furthermore, in the term T5 in which the output voltage V10 changes in a range from −E/2 [V] to −E [V] in FIG. 6, the controller 6 repeats operations so as to switch between the sixth to eighth modes, as shown in TABLE 1. Here, the controller 6 achieves a balance between discharging and charging of the first capacitor C1 and the second capacitor C2 by adjusting the time lengths of the sixth mode and the seventh mode.

In the present embodiment, the controller 6 controls the output voltage V20 generated between the first output point 103 and the second output point 104 such that the waveform of the output voltage V10 approximates a sine wave by performing switching between the first to eighth modes described above by changing the duty ratio of the PWM signal. In short, the power-converting device 1 generates a sinusoidal AC voltage (output voltage V10) between the third output point 105 and the fourth output point 106 by causing the magnitude of the output voltage V20 generated between the first output point 103 and the second output point 104 to change in five levels by the controller 6.

Note that the fourth mode and the fifth mode are modes in which the output voltage V20 is 0 [V] and that contribute neither discharging nor charging of the first capacitor C1 and the second capacitor C2. Therefore, although it is conceivable to omit one of the fourth mode and the fifth mode, when

TABLE 1

| Term | Output voltage V20 [V] | Mode | Charge/ Discharge | Q1, Q8 | Q2, Q7 | Q3, Q6 | Q4, Q5 | Q9 | Q10 | Q11 | Q12 |
|---|---|---|---|---|---|---|---|---|---|---|---|
| T2 | +E | 1st | | ON | ON | OFF | OFF | OFF | OFF | OFF | ON |
| T1, T3 | +E/2 | 2nd | charge | ON | OFF | ON | OFF | OFF | OFF | OFF | ON |
| | +E/2 | 3rd | discharge | OFF | ON | OFF | OFF | OFF | OFF | ON | ON |
| | 0 | 4th | | OFF | OFF | ON | OFF | OFF | OFF | ON | ON |
| T4, T6 | 0 | 5th | | OFF | ON | OFF | OFF | ON | ON | OFF | OFF |
| T5 | −E/2 | 6th | discharge | OFF | OFF | ON | OFF | ON | ON | OFF | OFF |
| | −E/2 | 7th | charge | OFF | ON | OFF | ON | OFF | ON | OFF | OFF |
| | −E | 8th | | OFF | OFF | ON | ON | OFF | ON | OFF | OFF |

Here, the controller 6 switches on and off of the first to twelfth switching elements Q1 to Q12 with a PWM signal so as to realize the first to eighth modes.

More specifically, in the terms T1 and T3 in which the output voltage V10 changes in a range from 0 [V] to E/2 [V] in FIG. 6, the controller 6 repeats operations so as to switch between the second to fourth modes, as shown in TABLE 1. Here, the controller 6 achieves a balance between discharging and charging of the first capacitor C1 and the second capacitor C2 by adjusting the time lengths of the second mode and the third mode.

a balance between negative and positive of the output voltage V10 is taken into consideration, it is better to divide the mode into the fourth mode and the fifth mode in the power-converting device 1 so as to make the switching loss small and improve efficiency.

According to the power-converting device 1 of the present embodiment, the number of elements (hereinafter, referred to as "the number of passing elements") among the semiconductor elements (switching elements, diodes) through which a current flows is "four" or less in any of the first to eighth modes, as described above.

Specifically, in the third and fourth modes in which the second bi-directional switch 14 is in an all-on state, even if the eleventh switching element Q11 and the twelfth switching element Q12 are counted as different elements, the number of passing elements is "four". Similarly, in the fifth and sixth modes in which the first bi-directional switch 13 is in all-on state, even if the ninth switching element Q9 and the tenth switching element Q10 are counted as different elements, the number of passing elements is "four". Therefore, in the case where the first and second bi-directional switches 13 and 14 are each constituted by one element, the number of passing elements in the third to sixth modes is "three".

Incidentally, the controller 6 preferably switches between the sustaining mode and the charging mode or the discharging mode such that each of the first capacitor C1 and the second capacitor C2 repeats charging and discharging so as to have a voltage that changes with a center of the voltage being a reference voltage. The reference voltage mentioned here is a voltage having a magnitude that is a quarter of the voltage (E/4 [V]) that is applied between the first input point 101 and the second input point 102 from the DC power supply 100 as described above. Accordingly, the voltage of the first capacitor C1 and the voltage of the second capacitor C2 in the basic operation are each kept at the reference voltage (E/4 [V]), which is a target voltage.

Furthermore, in this case, the controller 6 preferably switches between the sustaining mode and the charging mode or the discharging mode such that the average value of the detection result of the first detector 21 and the detection result of the second detector 22 (detection result of the detection circuit) becomes the reference voltage.

Incidentally, in the power-converting device 1 of the present embodiment, the second bi-directional switch 14 is in an all-on state in the third and fourth modes, and the first bi-directional switch 13 is in an all-on state in the fifth and sixth modes. That is, in any of the first to eighth modes, the elements among the semiconductor elements (switching elements, diodes) through which a current flows are any of the first to twelfth switching elements Q1 to Q12, and no current flows through the diodes (first to twelfth diodes D1 to D12). Therefore, the power-converting device 1 can allow a current to flow in both directions between the first output point 103 and the second output point 104 in any of the first to eighth modes.

Hereinafter, a current that flows in the conversion circuit 10 in a direction indicated by each of the thick line arrows in FIGS. 2A, 2B, 3A, 3B, 4A, 4B, 5A, and 5B will be referred to as a "forward direction current", and a current that flows in the conversion circuit 10 in a direction opposite to the forward direction current will be referred to as "reverse direction current". That is, in the first to fourth modes in which the output voltage V10 changes in a range from 0 [V] to E [V], a current that flows from the first output point 103 toward the third output point 105 is the forward direction current. In the fifth to eighth modes in which the output voltage V10 changes in a range from 0 [V] to –E [V], a current that flows from the second output point 104 to the fourth output point 106 is the forward direction current.

In the power-converting device 1, since the conversion circuit 10 is adapted to the currents in both directions, a phase difference can be set between an output current that flows between the third output point 105 and the fourth output point 106 and the output voltage V10 generated between the third output point 105 and the fourth output point 106. In short, when a phase difference exists between the output current and the output voltage V10, a period occurs in which the output current has a different polarity from the output voltage V10 (the output voltage V10 is positive and the output current is negative, for example).

Here, the current that flows in the conversion circuit 10 in a period in which the output current and the output voltage V10 have the same polarity is a forward direction current, and the current that flows in the conversion circuit 10 in a period in which the output current and the output voltage V10 have different polarities is a reverse direction current. Therefore, in the power-converting device 1, in the case of setting a phase difference between the output current and the output voltage V10, the conversion circuit 10 needs to be adapted to the currents in both directions. In the power-converting device 1 of the present embodiment, the conversion circuit 10 is adapted to the currents in both directions, and as a result, a phase difference can be set between the output current and the output voltage V10.

In particular, in the case where the power-converting device 1 is employed for a power conditioner 20 (refer to FIG. 7) for a solar power generator, there are cases in which a phase difference is set between the output current and the output voltage V10 in the power-converting device 1 for the purpose of detecting an isolated operation or suppressing an increase in the voltage of the utility grid 7. Also, in the case where the power-converting device 1 is employed for a power conditioner for an electric storage device, the power-converting device 1 controls the direction in which power is supplied by setting a phase difference between the output current and the output voltage V10, and thereby switches between charging and discharging of the electric storage device. The conversion circuit 10 generates a state in which a current can pass in both directions, and as a result, the power-converting device 1 of the present embodiment can be adapted to these applications.

Configuration of Power Conditioner

Figure 7:
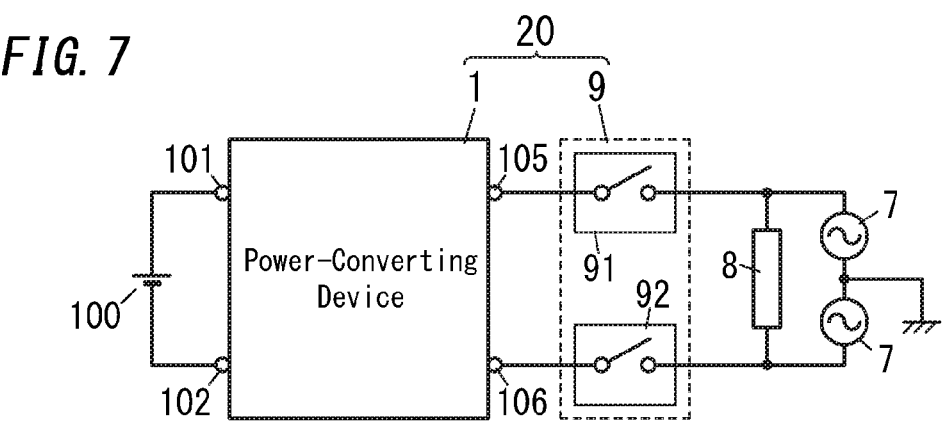
FIG. 7 is a schematic diagram illustrating a configuration of a power conditioner according to Embodiment 1.

The power conditioner 20 according to the present embodiment includes the aforementioned power-converting device 1 and a parallel off device (a mechanical disconnection switch(es)) 9, as shown in FIG. 7. The parallel off device 9 is electrically connected between the first and second output points 103 and 104 (refer to FIG. 1) and the utility grid 7. In the example in FIG. 7, the parallel off device 9 is electrically connected between the third and fourth output points 105 and 106 and the utility grid 7. In other words, the parallel off device 9 is connected to the first output point 103 and the second output point 104 via the filter circuit 5 (refer to FIG. 1). That is, it is sufficient that the parallel off device 9 is located between the first and second output points 103 and 104 and the utility grid 7, and it is not essential that the parallel off device 9 is directly connected to the first output point 103 and the second output point 104. The parallel off device 9 may be connected downstream of the filter circuit 5, as in the case of the present embodiment.

Here, the parallel off device 9 includes a first contact portion 91 that is electrically connected between the third output point 105 and the utility grid 7 and a second contact portion 92 that is electrically connected between the fourth output point 106 and the utility grid 7. Note that it is sufficient that the parallel off device 9 is electrically connected between at least one of the third and fourth output points 105 and 106 and the utility grid 7, and one of the first contact portion 91 and the second contact portion 92 may be omitted.

The power conditioner 20 performs a system interconnection operation in a normal state, converts DC power inputted from the DC power supply 100 to AC power through the power-converting device 1, and outputs the AC power to the utility grid 7 and the load 8. The power conditioner 20 is configured, in an abnormal state such as power interruption in the utility grid 7, to cause the parallel off device 9 to open and to perform an isolated operation in which AC power is outputted in a state of being paralleled off from the utility grid 7, detailed description being omitted here.

According to the power conditioner 20, as a result of the parallel off device 9 being caused to open (being paralleled off), the first conversion circuit 11 and the second conversion circuit 12 can be electrically isolated from the utility grid 7. Therefore, as a result of causing the parallel off device 9 to open in the start-up period, which is a period before the power-converting device 1 starts the aforementioned basic operation after power on, the power conditioner 20 can form a current path including the filter circuit 5 between the first output point 103 and the second output point 104.

The current path mentioned here is a current path including the inductor L1, the third capacitor C3, and the inductor L2 that constitute the filter circuit 5. The power-converting device 1 can charge the first capacitor C1 and the second capacitor C2, even if the third output point 105 is electrically isolated from the fourth output point 106, through this current path as a path for charging.

Accordingly, the power-converting device 1 can charge the first capacitor C1 and the second capacitor C2, even if the third output point 105 and the fourth output point 106 are not connected to the utility grid 7. In other words, the power-converting device 1 can perform charging of the capacitor (first capacitor C1 and second capacitor C2) necessary for a normal operation, even in a state (no-load state) in which no load is connected between the pair of output terminals (third output point 105 and fourth output point 106). Note that the normal operation mentioned herein is an operation of the power-converting device 1 in a period after the start-up period has passed, that is, after the first capacitor C1 and the second capacitor C2 have been charged to the reference voltage (E/4 [V]), and has the same meaning as the aforementioned basic operation.

That is, the controller 6 preferably selects the charging mode continuously in the start-up period from when the DC power supply 100 starts to supply power to the conversion circuit 10 until when the capacitor has been charged to a predetermined voltage (reference voltage). Note that the charging mode mentioned here is different from the charging mode (second and seventh modes) in the basic operation, and is a mode in which a current path including the filter circuit 5 is formed between the first output point 103 and the second output point 104 by causing the parallel off device 9 to open. When the first capacitor C1 and the second capacitor C2 are charged to the reference voltage (E/4 [V]), the power-converting device 1 shifts the operation to the aforementioned basic operation, and operates so as to switch between the charging mode (second and seventh modes) and the discharging mode (third and sixth modes).

According to this configuration, the power-converting device 1 charges the capacitor by continuously selecting the charging mode without performing switching between the charging mode and the discharging mode in the start-up period, and as a result, the start-up period can be shortened and the operation can be shifted to the basic operation quickly.

Charging and Discharging of Capacitor

Hereinafter, how the power-converting device 1 of the present embodiment switches between charging and discharging of the capacitor in the basic operation will be described in detail. That is, the controller 6 generates the PWM signal such that the sustaining mode and the charging mode or the discharging mode are switched in a manner as described below. For example, in the terms T1 and T3 (refer to FIG. 6) in which the output voltage V10 changes in a range from 0 [V] to E/2 [V], the controller 6 changes between the fourth mode which is a sustaining mode, and the second mode which is a charging mode or the third mode which is a discharging mode.

In the present embodiment, the controller 6 is configured to switch between the charging mode and the discharging mode in one cycle of the reference wave such that the charging mode and the discharging mode are both included in one cycle of the reference wave. The power-converting device 1 of the present embodiment obtains the reference wave from one or more carrier waves having no phase difference, and switches between the sustaining mode and the charging mode or the discharging mode according to the result of comparison between the reference wave and the signal wave with respect to the magnitude thereof. In other words, the operating states of the controller 6 include a first state in which the sustaining mode and the charging mode are switched according to the result of comparison between the signal wave and the reference wave, and a second state in which the sustaining mode and the discharging mode are switched according to the result of comparison between the signal wave and the reference wave. That is, the power-converting device 1 includes two states, namely the first state and the second state, as the operating states of the controller 6. The signal wave mentioned here is a signal wave that is based on a target value of the output voltage V10, that is, a sine wave that is the same as the utility grid 7.

Furthermore, the power-converting device 1 of the present embodiment switches between the charging mode and the discharging mode according to the determination result as to whether the carrier wave is rising or falling. That is, the controller 6 performs switching between the sustaining mode and the charging mode or the discharging mode according to the result of comparison between the reference wave and the signal wave, and performs switching between the charging mode and the discharging mode according to the determination result as to whether the carrier wave is rising or falling. Accordingly, in the power-converting device 1, both the charging mode and the discharging mode are included in one cycle of the reference wave.

Figure 8:
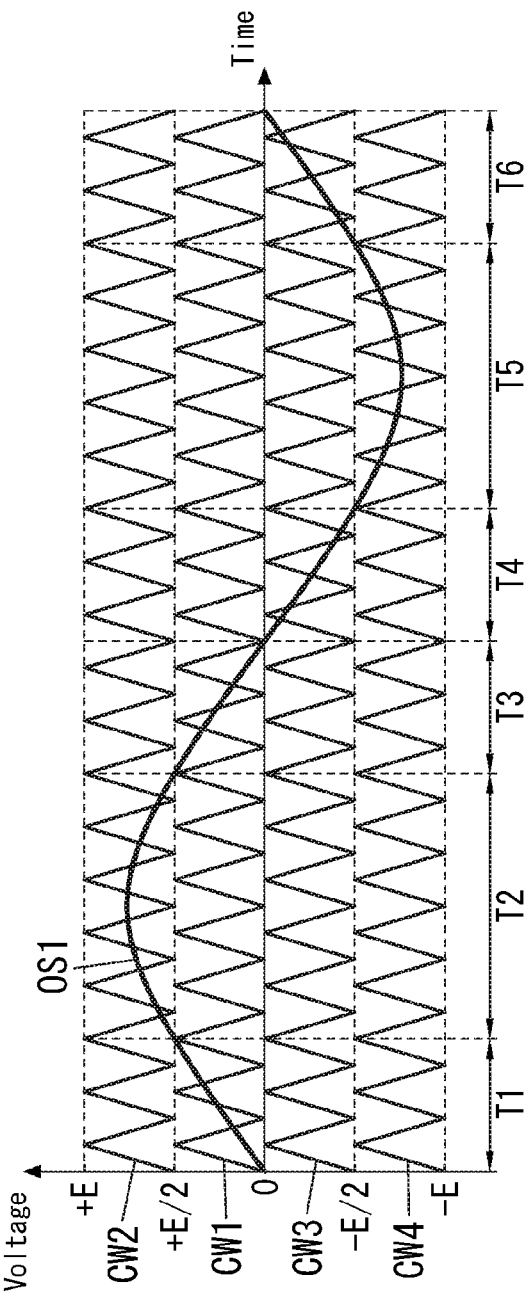
FIG. 8 is a waveform diagram illustrating a relationship between a signal wave and a reference wave in a reference example of Embodiment 1.

First, a reference example based on four carrier waves CW1 to CW4 having no phase difference will be briefly described with reference to FIG. 8. FIG. 8 shows a relationship between a signal wave OS1 (indicated by a thick line) and the carrier waves CW1 to CW4, where the horizontal axis is a time axis and the vertical axis is voltage. Note that, in FIG. 8, because the relationship between the signal wave OS1 and the carrier waves CW1 to CW4 is schematically shown, only 20 cycles of each of the carrier waves CW1 to CW4 are included in one cycle of the signal wave OS1, but the configuration is not limited thereto. In actuality, approximately several tens to several hundreds of cycles of each of the carrier waves CW1 to CW4 may be included in one cycle of the signal wave OS1.

In this reference example, the first carrier wave CW1 is a triangular wave that periodically oscillates between 0 [V] and E/2 [V], 0 [V] being the minimum value and E/2 [V] being the maximum value. The second carrier wave CW2 is a triangular wave that periodically oscillates between E/2 [V] and E [V], E/2 [V] being the minimum value and E [V] being the maximum value. The third carrier wave CW3 is a triangular wave that periodically oscillates between 0 [V]

and −E/2 [V], 0 [V] being the maximum value and −E/2 [V] being the minimum value. The fourth carrier wave CW4 is a triangular wave that periodically oscillates between −E/2 [V] and −E [V], −E/2 [V] being the maximum value and −E [V] being the minimum value. Also, these first to fourth carrier waves CW1 to CW4 are each a triangular wave in which the voltage change rate (relative voltage change) per unit time is equal when rising and falling.

In the reference example, the signal wave has the same waveform as the output voltage V10 shown in FIG. 6, and has a sinusoidal waveform that changes in a range from −E [V] to E [V].

In the reference example based on the first to fourth carrier waves CW1 to CW4, the controller 6 can generate the PWM signal according to the result of comparison between the reference wave and the signal wave OS1 in each of the terms T1 to T6, and can switch between the sustaining mode and the charging mode or the discharging mode. That is, in the terms T1 and T3 in which the signal wave OS1 changes in a range from 0 [V] to E/2 [V], for example, the controller 6 generates the PWM signal according to the result of comparison between the signal wave OS1 and the first carrier wave CW1 of the reference wave (first to fourth carrier waves CW1 to CW4). Also, in the term T2 in which the signal wave OS1 changes in a range from E/2 [V] to E [V], for example, the controller 6 generates the PWM signal according to the result of comparison between the signal wave OS1 and the second carrier wave CW2 of the reference wave (first to fourth carrier waves CW1 to CW4). However, in the reference example based on the four carrier waves CW1 to CW4, the configurations of the generation unit 3 and the processing in the controller 6 become complicated.

Figure 9:
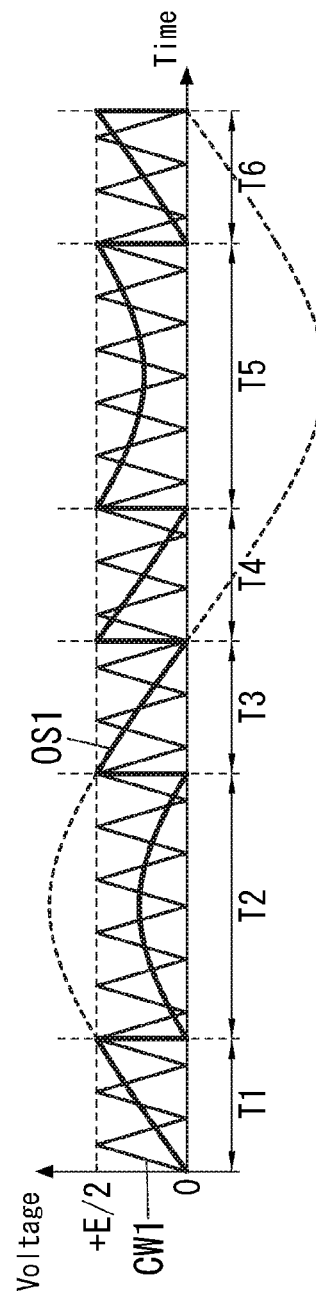
FIG. 9 is a waveform diagram illustrating a relationship between a signal wave and a reference wave in a reference example of Embodiment 1.

Therefore, it is conceivable that the configuration of the generation unit 3 and the processing in the controller 6 is simplified based on the reference wave obtained from only one continuous carrier wave CW1, as shown in FIG. 9. FIG. 9 shows a relationship between the signal wave OS1 (indicated by thick lines) and the carrier wave CW1, where the horizontal axis is a time axis and the vertical axis is voltage. Note that, in FIG. 9, similarly to FIG. 8, only 20 cycles of the carrier wave CW1 are included in one cycle of the signal wave OS1, but the configuration is not limited thereto. In actuality, approximately several tens to several hundreds of cycles of the carrier wave CW1 may be included in one cycle of the signal wave OS1.

In the example in FIG. 9, the carrier wave CW1 is a triangular wave that periodically oscillates between 0 [V] and E/2 [V], 0 [V] being the minimum value and E/2 [V] being the maximum value. Also, the carrier wave CW1 is a triangular wave in which the voltage change rate per unit time is equal when rising and falling. Note that the carrier wave CW1 shown in FIG. 9 is merely an example, and the carrier wave CW1 may be a triangular wave in which the voltage change rate per unit time is different when rising and falling.

In the example in FIG. 9, the signal wave OS1 has a waveform that is based on the same sine wave (indicated by broken lines in the drawing) as the utility grid 7, but is not the sine wave itself, and is shaped such that the sine wave is appropriately shifted according to the terms T1 to T6. That is, the signal wave OS1 in FIG. 9 has a waveform such that the original sine wave is shifted by E/2 [V] in a negative (minus) direction in the term T2 in which the original sine wave exceeds E/2 [V] such that the signal wave OS1 is fitted into a range from 0 [V], which is the minimum value of the carrier wave CW1, to E/2 [V], which is the maximum value thereof. Also, the signal wave OS1 in the terms T4 and T6 in which the original sine wave changes in a range from 0 [V] to −E/2 [V] has a waveform such that the original sine wave is shifted by E/2 [V] in the positive (plus) direction. Furthermore, the signal wave OS1 in the term T5 in which the original sine wave changes in a range from −E/2 [V] to −E [V] has a waveform such that the original sine wave is shifted by E [V] in the positive (plus) direction.

As shown in FIG. 9, it becomes possible to generate the PWM signal from the signal wave OS1 according to the result of comparison between one carrier wave CW1 and the signal wave OS1, and to switch between the sustaining mode and the charging mode or the discharging mode.

Hereinafter, a description will be given in which the result of comparison between the carrier wave CW1 and the signal wave OS1 is a comparison signal Sj1 and the determination result as to whether the carrier wave CW1 is rising (positive slope) or falling (negative slope) is a determination signal Sj0. The comparison signal Sj1 is a signal that becomes "H" (High Level) in a period in which the signal wave OS1 exceeds the carrier wave CW1 (OS1>CW1). The determination signal Sj0 is a signal that becomes "H" in a period in which the carrier wave CW1 is rising.

In the configuration based on the signal wave OS1 shown in FIG. 9, the controller 6 selects one of the sustaining mode, the charging mode, and the discharging mode according to the comparison signal Sj1 and the determination signal Sj0 in accordance with the determination condition shown in TABLE 2.

TABLE 2

| Term | Comparison signal Sj1 | Determination signal Sj0 | Mode to be selected |
|---|---|---|---|
| T1, T3, T5 | L | H | sustaining mode |
| | L | L | sustaining mode |
| | H | H | charging mode |
| | H | L | discharging mode |
| T2, T4, T6 | H | H | sustaining mode |
| | H | L | sustaining mode |
| | L | H | charging mode |
| | L | L | discharging mode |

Note that, in the configuration based on the signal wave OS1 as shown in FIG. 9, the determination condition in accordance with which the mode to be applied is selected from the sustaining mode, the charging mode, and the discharging mode may be different according to the terms T1 to T6, as shown in TABLE 2. For example, the condition in accordance with which the charging mode is selected is that, while the condition in the term T1 is that the comparison signal Sj1 is "H" and the determination signal Sj0 is "H", the comparison signal Sj1 is "L" (Low Level) and the determination signal Sj0 is "H" in the term T2, and thus the determination condition is different in the terms T1 and T2.

Figure 10:
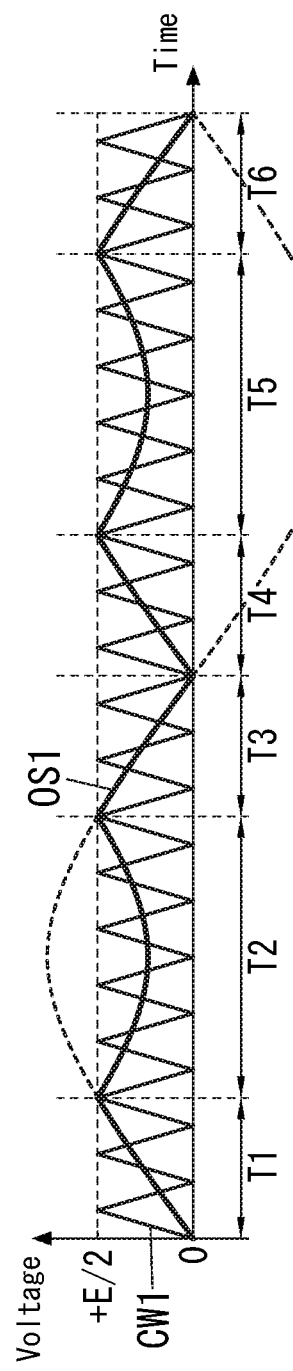
FIG. 10 is a waveform diagram illustrating a relationship between a signal wave and a reference wave in Embodiment 1.

Therefore, in the present embodiment, by devising the shape of the signal wave OS1, as shown in FIG. 10, the determination condition in accordance with which one of the sustaining mode, the charging mode, and the discharging mode is selected is made the same regardless of the terms T1 to T6. The carrier wave CW1 in the example in FIG. 10 has the same waveform as the carrier wave CW1 in the example in FIG. 9.

Meanwhile, the signal wave OS1 in the example in FIG. 10 has a waveform that is based on the same sine wave (indicated by broken lines in the drawing) as the utility grid 7, and is shaped such that the sine wave is appropriately shifted and inverted according to the terms T1 to T6. That is, the signal wave OS1 in FIG. 10 has a waveform such that the original sine wave is inverted with E/2 [V] being the center in the term T2 in which the original sine wave exceeds E/2 [V] such that the signal wave OS1 is fitted into a range from 0 [V], which is the minimum value of the carrier wave CW1, to E/2 [V], which is the maximum value thereof. In other words, the signal wave OS1 in the term T2 has a waveform such that the original sine wave is inverted with respect to positive and negative with 0 [V] being the center, and is shifted by E [V] in the positive (plus) direction. Also, the signal wave OS1 in the terms T4 and T6 in which the original sine wave changes in a range from 0 [V] to –E/2 [V] has a waveform such that the original sine wave is inverted with respect to positive and negative with 0 [V] being the center. Furthermore, the signal wave OS1 in the term T5 in which the original sine wave changes in a range from –E/2 [V] to –E [V] has a waveform such that the original sine wave is inverted with respect to positive and negative with 0 [V] being the center and is also inverted with E/2 [V] being the center. In other words, the signal wave OS1 in the term T5 has a waveform such that the original sine wave is shifted by E [V] in the positive (plus) direction.

The power-converting device 1 of the present embodiment generates the PWM signal according to the result of comparison between the one carrier wave CW1 and the signal wave OS1, as shown in FIG. 10, and switches between the sustaining mode and the charging mode or the discharging mode. Furthermore the power-converting device 1 of the present embodiment switches between the charging mode and the discharging mode according to the determination result as to whether the carrier wave CW1 is rising or falling.

Based on the signal wave OS1 shown in FIG. 10, the controller 6 of the present embodiment selects one of the sustaining mode, the charging mode, and the discharging mode according to the comparison signal Sj1 and the determination signal Sj0 in accordance with the determination condition shown in TABLE 3 regardless of the terms T1 to T6.

TABLE 3

| Comparison signal Sj1 | Determination signal Sj0 | Mode to be selected |
|---|---|---|
| L | H | sustaining mode |
| L | L | sustaining mode |
| H | H | charging mode |
| H | L | discharging mode |

The operations of the controller 6 in accordance with the determination condition shown in TABLE 3 will be described in more detail with reference to FIG. 11. Hereinafter, the controller 6 is assumed to output a charging signal Sc1 that becomes "H" in a period in which the conversion circuit 10 operates in the charging mode and a discharging signal Sd1 that becomes "H" in a period in which the conversion circuit 10 operates in the discharging mode.

Figure 11:
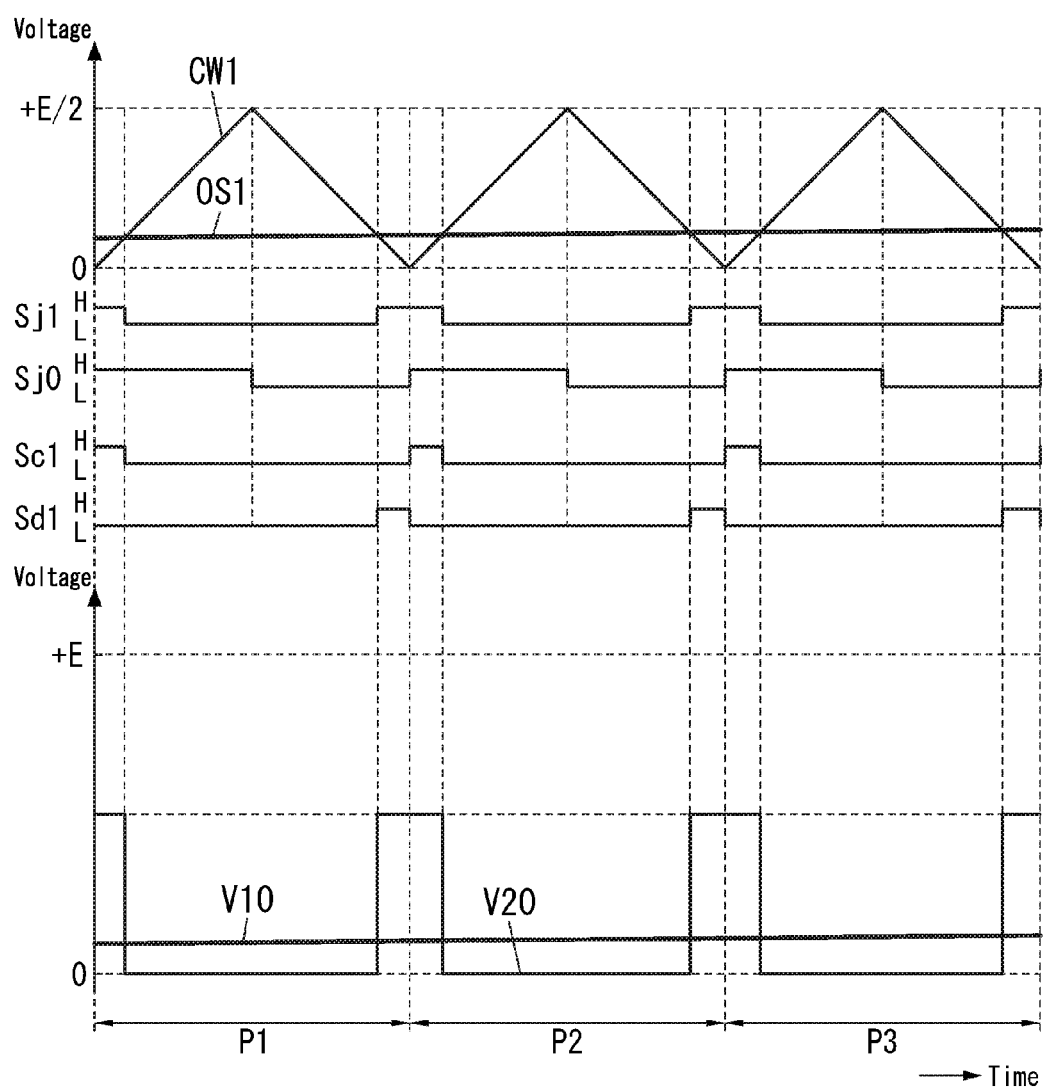
FIG. 11 is a timing chart illustrating an operation of the power-converting device according to Embodiment 1.

FIG. 11 shows the operation of the controller 6 in the term T1, as an example. That is, in the term T1, the controller 6 selects the charging mode or the discharging mode in a period in which the signal wave OS1 exceeds the carrier wave CW1 (period in which the comparison signal Sj1 is "H"). The controller 6 selects the sustaining mode in a period in which the signal wave OS1 is less than or equal to the carrier wave CW1 (OS1≤CW1) (period in which the comparison signal Sj1 is "L"). Also, the controller 6 selects the charging mode in a period in which the carrier wave CW1 is rising (period in which the determination signal Sj0 is "H") from among the periods in which the signal wave OS1 exceeds carrier wave CW1, and sets the charging signal Sc1 to "H". The controller 6 selects the discharging mode in a period in which the carrier wave CW1 is falling (period in which the determination signal Sj0 is "L") from among the periods in which the signal wave OS1 exceeds carrier wave CW1, and sets the discharging signal Sd1 to "H".

Accordingly, in the power-converting device 1, both the charging mode and the discharging mode are included in one cycle (in each of the first to third cycles P1 to P3) of the carrier wave CW1, as shown in FIG. 11. Here, in the term T1, the charging mode is the second mode, the discharging mode is the third mode, and the sustaining mode is the fourth mode. Therefore, in the term T1, the controller 6 switches between the second to fourth modes in the order of the second mode, the fourth mode, and the third mode, in each of the first to third cycles P1 to P3.

As a result, in each of the first to third cycles P1 to P3 in the term T1, the output voltage V20 generated between the first output point 103 and the second output point 104 switches in the order of E/2 [V] (second mode), 0 [V] (fourth mode), and E/2 [V] (third mode), as shown in FIG. 11. Here, in the term T1, the second and third modes and the fourth mode are switched according to the PWM signal, and therefore, when the signal wave OS1 rises, the duty ratio of the fourth mode decreases, and the duty ratio of the second and third modes increases. In other words, in the output voltage V20, the duty ratio of 0 [V] decreases, and the duty ratio of E/2 [V] increases. Here, the output voltage V10 generated between the third output point 105 and the fourth output point 106 corresponds to the average value of the output voltage V20, and therefore, the output voltage V10 increases as the signal wave OS1 rises, as shown in FIG. 11.

Similarly, in the remaining terms T2 to T6, the power-converting device 1 of the present embodiment switches between the sustaining mode, the charging mode, and the discharging mode according to the result of comparison between the carrier wave CW1 and the signal wave OS1 and the determination result as to whether the carrier wave CW1 is rising or falling in accordance with the determination condition in TABLE 3.

Here, the controller 6 preferably adjusts the respective ratios of the charging mode and the discharging mode that occupy the one cycle of the reference wave according to the voltage of the capacitor (first capacitor C1 and second capacitor C2) that is detected (measured) by the detection circuit (first detector 21 and second detector 22). In this case, the controller 6 preferably increases the ratio of the charging mode if the voltage of the capacitor detected by the detection circuit is less than the lower limit value in the target range, and increases the ratio of the discharging mode if the voltage of the capacitor detected by the detection circuit is greater than the upper limit value in the target range.

That is, in the power-converting device 1 of the present embodiment, the voltage V1 of the first capacitor C1 and the voltage V2 of the second capacitor C2 are detected (measured) by the detection circuit constituted by the first detector 21 and the second detector 22, as described above. Therefore, the controller 6 can adjust the respective ratios of the charging mode and the discharging mode that occupy one cycle of the reference wave based on the detection result (average value of both the voltages V1 and V2) of the detection circuit. At this time, the controller 6 can keep the voltage of the capacitor inside the target range by comparing the detection result of the detection circuit with the lower limit value and the upper limit value of the target range. The target range mentioned here is a voltage range that is the target of the voltage V1 of the first capacitor C1 and the voltage V2 of the second capacitor C2, and is a fixed range (E/4±α [V]) with the reference voltage being the center, for example. Note that the width of the target range can be arbitrarily set, and may be zero (lower limit value=upper limit value).

Specifically, in the present embodiment, the period in which the carrier wave is rising (period in which the determination signal Sj0 is "H") is assigned to the charging mode, and the period in which the carrier wave is falling (period in which the determination signal Sj0 is "L") is assigned to the discharging mode. Thus, the controller 6 adjusts the respective ratios of the charging mode and the discharging mode that occupy one cycle of the reference wave by separately adjusting the slope (voltage change rate per unit time) of the triangular wave serving as the carrier wave when rising and falling.

Figure 12:
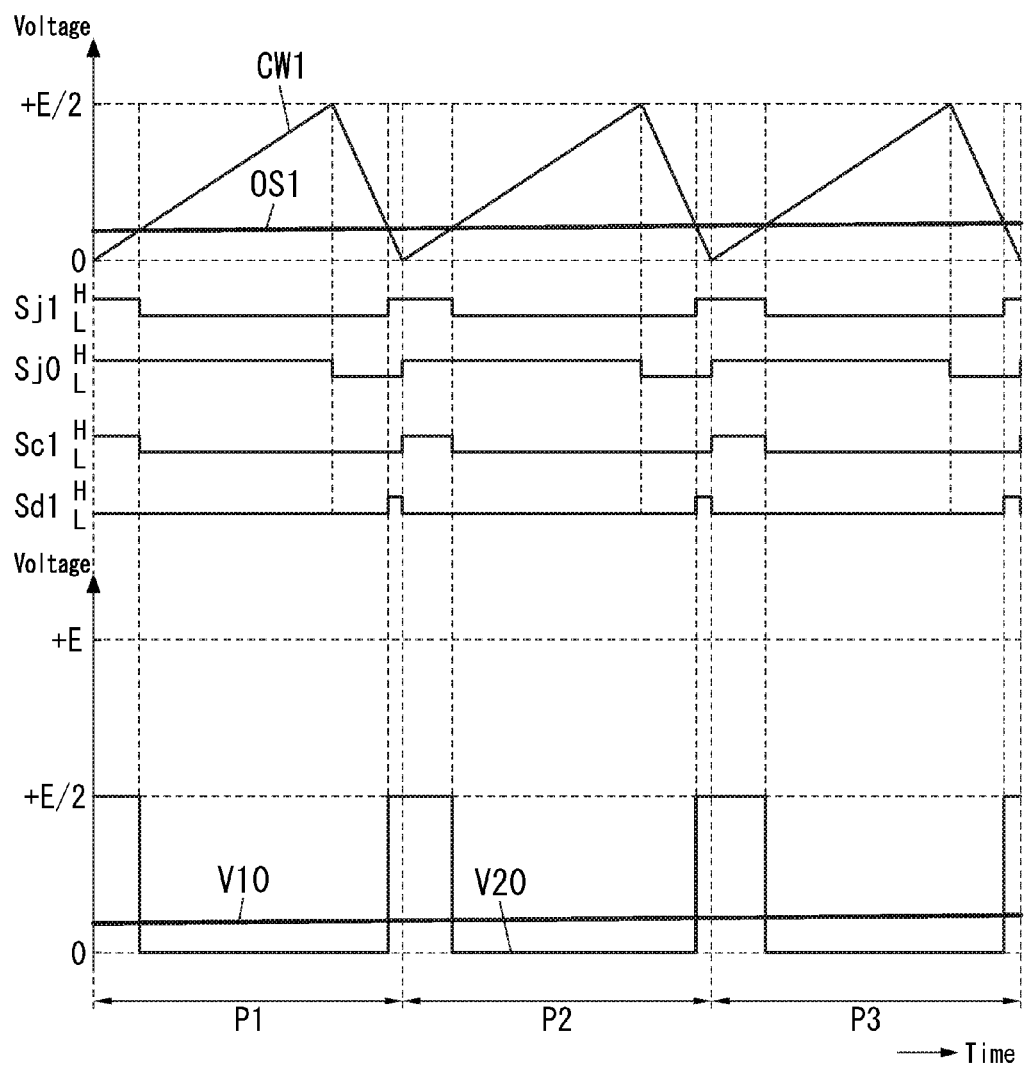
FIG. 12 is a timing chart illustrating another operation of the power-converting device according to Embodiment 1.

For example, if the slope of the carrier wave CW1 in rising is made smaller than that in falling, as shown in FIG. 12, the ratio of the period in which the carrier wave CW1 is rising that occupies one cycle of the reference wave (carrier wave CW1) becomes larger than the ratio of the period in which the carrier wave CW1 is falling. As a result, the controller 6 can make the ratio of the charging mode that occupies one cycle of the reference wave larger than that of the discharging mode. Note that although FIG. 12 shows the operation of the controller 6 in the term T1 similarly to FIG. 11, the operation of the controller 6 is similar in the remaining terms T2 to T6 as well.

Effects

The power-converting device 1 of the present embodiment described above switches, according to the result of comparison between the signal wave and the reference wave, between the sustaining mode in which charging and discharging of the capacitor is not performed and the charging mode in which charging of the capacitor is performed or the discharging mode in which discharging of the capacitor is performed. The capacitor mentioned here is constituted by the first capacitor C1 and the second capacitor C2. That is, the power-converting device 1 can switch between the sustaining mode and the charging mode or the discharging mode according to the cycle of the at least one carrier wave that constitutes the reference wave. Therefore, as a result of increasing the frequency of the carrier wave (that is, decreasing the cycle length), the power-converting device 1 can frequently switch between charging and discharging of the capacitor, and thereby the voltage fluctuation of the capacitor can be suppressed to a minimum. As a result, even if including a capacitor having a relatively small capacitance, the power-converting device 1 can suppress the voltage fluctuation of the capacitor and obtain a desired output voltage V20, and therefore, has an advantage in that the size of the capacitor can be reduced.

Also, in the power-converting device 1, the conversion circuit 10 preferably includes the first conversion circuit 11, the second conversion circuit 12, the first bi-directional switch 13, and the second bi-directional switch 14, as in the present embodiment. The power-converting device 1 includes the first conversion circuit 11 and the second conversion circuit 12 that are connected in parallel between the two terminals of the DC power supply 100, and the first conversion circuit 11 and the second conversion circuit 12 are connected by the first bi-directional switch 13 and the second bi-directional switch 14. Here, the first conversion circuit 11 includes four switching elements (first to fourth switching elements Q1 to Q4) and one capacitor (first capacitor C1). Similarly, the second conversion circuit 12 includes four switching elements (fifth to eighth switching elements Q5 to Q8) and one capacitor (second capacitor C2).

In this configuration, a current that is input from the DC power supply 100 to the power-converting device 1 only passes through four elements at most from among the ten switching elements (first to eighth switching elements Q1 to Q8 and first and second bi-directional switches 13 and 14). Therefore, the sum of conduction losses (losses) of the switching elements is relatively small, and therefore, the power-converting device 1 has as advantage in that the power conversion efficiency can further be improved.

Furthermore, the power-converting device 1 requires, in general, a larger heat radiator (air cooling device such as a heat sink or fan) as the conduction loss increases, because the larger the conduction loss, the larger the amount of heat generated. The conduction loss is suppressed to a small loss in the power-converting device 1 of the present embodiment, and therefore, the size of the heat radiator can be expected to be reduced.

Also, when a comparison is made with the configuration described in Document 1, the power-converting device 1 of the present embodiment also has an advantage in that the size of the overall device can be reduced by an amount corresponding to the fact that capacitors for dividing voltage are not needed. That is, in the power-converting device described in Document 1, a DC voltage E is divided into two E/2 by applying the DC voltage E to a series circuit of two DC capacitors, and therefore, the two DC capacitors are essential constituent elements. On the other hand, in the power-converting device 1 of the present embodiment, since the capacitors for dividing voltage are not needed, the size of the overall device can be reduced by an amount that corresponds to the capacitors.

Also, in this case, it is preferable that the reference voltage is a voltage having a magnitude that is a quarter of the voltage applied between the first input point 101 and the second input point 102 from the DC power supply 100, as in the present embodiment. In this case, the controller 6 preferably switches between the sustaining mode and the charging mode or the discharging mode such that each of the first capacitor C1 and the second capacitor C2 repeats charging and discharging so as to have a voltage that changes with a center of the voltage being the reference voltage.

According to this configuration, the power-converting device 1 can switch the output voltage V20 to be generated between the first output point 103 and the second output point 104 in three levels, namely E [V], E/2 [V], and 0 [V], in the first to fourth modes, as described above. In the fifth to eighth modes, the power-converting device 1 switches the output voltage V20 to be generated between the first output point 103 and the second output point 104 in three levels, namely 0 [V], −E/2 [V], and −E [V]. As a result, the power-converting device 1 can switch the output voltage V20 in five levels, namely E [V], E/2 [V], 0 [V], −E/2 [V], and −E [V], by switching between the first to eighth modes.

In short, the power-converting device 1 according to the present embodiment operates similarly to a three-level inverter, despite being a five-level inverter in which the output voltage V20 is to be switched in five levels, and therefore, the number of passing through elements can be made "four" or less, similarly to the three-level inverter. Therefore, the power-converting device 1 can suppress the number of passing through elements to be small compared with a general five-level inverter in which the number of passing through elements is "6". As a result, the power conversion efficiency can further be improved. Note that this configuration is not an essential configuration, and can be omitted appropriately.

Furthermore, in this case, the power-converting device 1 preferably includes the first detector 21 that detects (measures) the voltage V1 of the first capacitor C1 and the second detector 22 that detects (measures) the voltage V2 of the second capacitor C2. In this case, the controller 6 preferably switches between the sustaining mode and the charging mode or the discharging mode such that the average value (detection result of the detection circuit) of the detection result of the first detector 21 and the detection result of the second detector 22 is equal to the reference voltage.

According to this configuration, the power-converting device 1 can keep each of the voltages V1 and V2 in the vicinity of the reference voltage even in a case where the capacitance is different between the first capacitor C1 and the second capacitor C2 due to aging degradation or variation in components. Note that this configuration is not an essential configuration, and can be omitted appropriately.

Also, the controller 6 is preferably configured to switch between the charging mode and the discharging mode in one cycle of the reference wave such that both the charging mode and the discharging mode are included in one cycle of the reference wave, as in the present embodiment.

According to this configuration, since both the charging mode and the discharging mode are included in one cycle of the reference wave, the controller 6 can achieve a balance between discharging and charging of the capacitor (first capacitor C1 and second capacitor C2) with a relatively simple control, and suppress the voltage fluctuation of the capacitor to a minimum.

Also, the controller 6 is preferably configured to adjust respective ratios of the charging mode and the discharging mode that occupy one cycle of the reference wave according to the voltage of the capacitor detected by the detection circuit (first detector 21 and second detector 22), as in the present embodiment.

According to this configuration, the controller 6 can correct, even in a case where the voltage of the capacitor shifts from the reference voltage, the shift by adjusting respective ratios of the charging mode and the discharging mode that occupy one cycle of the reference wave.

In this case, the controller 6 is preferably configured to increase the ratio of the charging mode if the voltage of the capacitor detected by the detection circuit is smaller than a lower limit value of a target range, and increase the ratio of the discharging mode if the voltage of the capacitor detected by the detection circuit is larger than an upper limit value of the target range.

According to this configuration, as a result of making the target range of the voltage of the capacitor have a width of some degree, the power-converting device 1 can suppress the frequency of switching between the charging mode and the discharging mode to low by not responding to a minute voltage fluctuation of the capacitor due to charging and discharging of the capacitor or due to noise. Therefore, the power-converting device 1 can reduce the switching loss, and the efficiency improves.

Note that the configuration in which the respective ratios of the charging mode and the discharging mode that occupy one cycle of the reference wave are adjusted is not an essential configuration, and can be omitted appropriately.

Also, it is preferable that the generation unit 3 is configured to generate one continuous carrier wave CW1 as the reference wave, and the controller 6 is configured to switch between the charging mode and the discharging mode according to a determination result as to whether the carrier wave CW1 is rising or falling, as in the present embodiment.

Accordingly, the configuration of the generation unit 3 and the processing in the controller 6 can be simplified. Note that this configuration is not an essential configuration, and can be omitted appropriately.

Also, the power-converting device 1 preferably includes the first state and the second state as the operating states of the controller 6, as in the present embodiment. The first state mentioned here is a state in which the sustaining mode and the charging mode are switched according to the result of comparison between the signal wave and the reference wave. The second state is a state in which the sustaining mode and the discharging mode are switched according to the result of comparison between the signal wave and the reference wave.

Accordingly, as a result of increasing the frequency of the carrier wave (that is, decreasing the cycle length), the power-converting device 1 can frequently switch between charging and discharging of the capacitor, and thereby the voltage fluctuation of the capacitor can be suppressed to a minimum. As a result, even if including a capacitor having a relatively small capacitance, the power-converting device 1 can suppress voltage fluctuation of the capacitor and obtain a desired output voltage V20, and therefore, has an advantage in that the size of the capacitor can be reduced.

Also, according to the power conditioner 20 according to the present embodiment, as a result of the parallel off device 9 being caused to open (being paralleled off), the first conversion circuit 11 and the second conversion circuit 12 can be electrically isolated from the utility grid 7. Therefore, the power conditioner 20 performs a system interconnected operation in a normal state, and can perform, in an abnormal state such as power interruption in the utility grid 7, an isolated operation in which AC power is outputted in a state of being paralleled off from the utility grid 7 by causing the parallel off device 9 to open.

Also, the operating state of the first bi-directional switch 13 preferably further includes the half-on state in which a current that flows from the second connection point 202 to the first connection point 201 is cut off, and a current that flows from the first connection point 201 to the second connection point 202 is allowed to pass, as in the present embodiment. In this case, the operating state of the second bi-directional switch 14 preferably further includes the half-on state in which a current that flows from the third connection point 203 to the fourth connection point 204 is cut off, and a current that flows from the fourth connection point 204 to the third connection point 203 is allowed to pass.

According to this configuration, in a mode such as the seventh or eighth mode in which a current that flows from the first connection point 201 to the second connection point 202 need not to be cut off, it is sufficient that the first bi-directional switch 13 is in a half-on state. Therefore, the controller 6 can continuously turn on the tenth switching element Q10 in periods (terms T4 to T6) in which operations to switch between the fifth to seventh modes, or between the sixth to eighth modes are repeatedly performed. That is, because the first bi-directional switch 13 is in an all-on state in the fifth and sixth modes, if the tenth switching element Q10 is turned off every time the mode is switched to the seventh or eighth mode, it is possible that a switching loss will occur in the tenth switching element Q10. As a result of the tenth switching element Q10 being continuously on when the mode is switched between the fifth to seventh modes or between the sixth to eighth modes, the power-converting device 1 of the present embodiment can reduce the switching loss that occurs in the first bi-directional switch 13.

Similarly, in a mode such as the first or second modes in which a current that flows from the fourth connection point 204 to the third connection point 203 need not to be cut off, it is sufficient that the second bi-directional switch 14 is in a half-on state. Therefore, as a result of the twelfth switching element Q12 being continuously on when the mode is switched between the first to third modes or between the second to fourth modes, the power-converting device 1 of the present embodiment can reduce the switching loss that occurs in the second bi-directional switch 14.

Furthermore, by causing the first bi-directional switch 13 to transition from a half-on state to an all-on state in a state in which a current flows through the first bi-directional switch 13, the controller 6 can further reduce a switching loss that occurs in the first bi-directional switch 13. That is, the controller 6 can realize a zero volt switching of the ninth switching element Q9 when the mode is switched from the seventh mode to the sixth mode, for example, by turning on the ninth switching element Q9 in a state where the ninth diode D9 is on (conducts). Similarly, the controller 6 can further reduce the switching loss that occurs in the second bi-directional switch 14 by causing the second bi-directional switch 14 to transition from a half-on state to an all-on state in a state in which a current flows through the second bi-directional switch 14.

Note that the power-converting device 1 is not limited to the configuration in which the conversion circuit 10 includes the first conversion circuit 11 and the second conversion circuit 12, and the first bi-directional switch 13 and the second bi-directional switch 14, as described above, and the configuration thereof can be appropriately changed. The number of the switching elements is not limited to 12 of the first to twelfth switching elements Q1 to Q12, and can be appropriately changed as well.

Also, each of the first to eighth switching elements Q1 to Q8 and the ninth to twelfth switching elements Q9 to Q12 is not limited to a depletion type n-channel MOSFET, and may be another semiconductor switch. For example, each element may be an IGBT (Insulated Gate Bipolar Transistor) or a power semiconductor device obtained from a wide band gap semiconductor material such as GaN (gallium nitride).

Also, the specific configuration of the bi-directional switch (each of the first bi-directional switch 13 and the second bi-directional switch 14) is not limited to the configuration described above. The bi-directional switch may be a bi-directional switch having a double gate (dual gate) structure obtained from a wide band gap semiconductor material such as GaN (gallium nitride).

Embodiment 2

A power-converting device 1 of the present embodiment is different from the power-converting device 1 of Embodiment 1 in that a generation unit 3 generates carrier waves each having a different phase as a reference wave, and the controller 6 operates based on a result of comparison between each of the carrier waves and a signal wave. The circuit configuration of the power-converting device 1 of the present embodiment is in common with the power-converting device 1 of Embodiment 1. Hereinafter, similar configurations to Embodiment 1 are provided with the same reference sign, and redundant description thereof will be omitted as appropriate.

That is, in Embodiment 1, a case was described where the power-converting device 1 obtains the reference wave from one or more carrier waves having no phase difference, and switches between the sustaining mode and the charging mode or the discharging mode according to a result of comparison in magnitude between the reference wave and the signal wave. On the other hand, the power-converting device 1 of the present embodiment obtains the reference wave from carrier waves each having a different phase, and switches between the sustaining mode and the charging mode or the discharging mode according to a result of comparison in magnitude between the reference wave and the signal wave.

First, a reference example based on eight carrier waves CW1 to CW8 each having a different phase will be briefly described with reference to FIG. 13. FIG. 13 shows a relationship between a signal wave OS1 (indicated by thick line) and the carrier waves CW1 to CW8, where the horizontal axis is a time axis and a vertical axis is voltage. Note that, in FIG. 13, because the relationship between the signal wave OS1 and the carrier waves CW1 to CW8 is schematically shown, only five cycles of each of the carrier waves CW1 to CW8 are included in one cycle of the signal wave OS1, but the configuration is not limited thereto. In actuality, approximately several tens to several hundreds of cycles of each of the carrier waves CW1 to CW8 may be included in one cycle of the signal wave OS1.

In this reference example, the first to eighth carrier waves CW1 to CW8 are each a triangular wave that periodically oscillates between −E [V] and E [V], −E [V] being the minimum value and E [V] being the maximum value. The phase difference between two adjacent carrier waves among the first to eighth carrier waves CW1 to CW8 is one eighth of a cycle of the carrier waves. Here, the first to eighth carrier waves CW1 to CW8 are arranged, in the order of the first carrier wave CW1, the second carrier wave CW2, the third carrier wave CW3, the fourth carrier wave CW4, the fifth carrier wave CW5, etc., at equal intervals along the time axis, the interval corresponding to a delay equivalent to one eighth of a cycle. Also, these first to eighth carrier waves CW1 to CW8 are each a triangular wave in which the voltage change rate per unit time is equal when rising and falling.

In the reference example, the signal wave has a waveform that is the same as the waveform of the output voltage V10 shown in FIG. 6, and has a sinusoidal waveform that changes in a range from −E [V] to E [V].

In the reference example based on the first to eighth carrier waves CW1 to CW8, the controller 6 can generate, in each of the terms T1 to T6, a PWM signal according to the result of comparison between the reference wave and the signal wave OS1, and switch between the sustaining mode and the charging mode or the discharging mode. That is, in the terms T1 and T3 in which the signal wave OS1 changes in a range from 0 [V] to E/2 [V], for example, the controller 6 generates a PWM signal according to the result of comparison between the signal wave OS1 and each of the first to eighth carrier waves CW1 to CW8. Similarly, in the term T2 in which the signal wave OS1 changes in a range from E/2 [V] to E [V] as well, for example, the controller 6 generates a PWM signal according to the result of comparison between the signal wave OS1 and each of the first to eighth carrier waves CW1 to CW8. Note that, in the reference example based on the eight carrier waves CW1 to CW8, the configuration of the generation unit 3 and the processing in the controller 6 become complicated.

Therefore, it is conceivable that the configuration of the generation unit 3 and the processing in the controller 6 are simplified by obtaining the reference wave from only two carrier waves CW1 and CW2 that have phases opposite to each other, as shown in FIG. 14. FIG. 14 shows a relationship between the signal wave OS1 (indicated by thick line) and the first and second carrier waves CW1 and CW2, where the horizontal axis is a time axis and a vertical axis is voltage. Note that, in FIG. 14, similarly to FIG. 13, only 20 cycles of each of the carrier waves CW1 and CW2 are included in one cycle of the signal wave OS1, but the configuration is not limited thereto. In actuality, approximately several tens to several hundreds of cycles of each of the carrier waves CW1 and CW2 may be included in one cycle of the signal wave OS1.

In the example in FIG. 14, the first and second carrier waves CW1 and CW2 are each a triangular wave that periodically oscillates between 0 [V] and E/2 [V], 0 [V] being the minimum value and E/2 [V] being the maximum value. The phase difference between the two carrier waves CW1 and CW2 is a half cycle of the carrier waves such that the first carrier wave CW1 and the second carrier wave CW2 have the opposite phases. Also, these first and second carrier waves CW1 and CW2 are each a triangular wave in which the voltage change rate per unit time is equal when rising and falling.

In the example in FIG. 14, similarly to the example in FIG. 9 that was described in Embodiment 1, the signal wave OS1 has a waveform that is based on the same sine wave (indicated by broken lines in the drawing) as the utility grid 7, but is not the sine wave itself, and is shaped such that the sine wave is appropriately shifted according to the terms T1 to T6. That is, the signal wave OS1 in FIG. 14 has a waveform such that the same sine wave as the utility grid 7 is appropriately shifted such that the signal wave OS1 is fitted into a range from 0 [V], which is the minimum value of the first and second carrier waves CW1 and CW2, to E/2 [V], which is the maximum value thereof.

By based on the signal wave OS1 as shown in FIG. 14, it becomes possible to generate the PWM signal according to the result of comparison between the first and second carrier waves CW1 and CW2 and the signal wave OS1, and to switch between the sustaining mode and the charging mode or the discharging mode. Note that, in the configuration based on the signal wave OS1 as shown in FIG. 14, the determination condition in accordance with which the mode to be applied is selected from the sustaining mode, the charging mode, and the discharging mode may be different according to the terms T1 to T6. For example, the determination condition is different in the terms T1 and T2.

Figure 15:
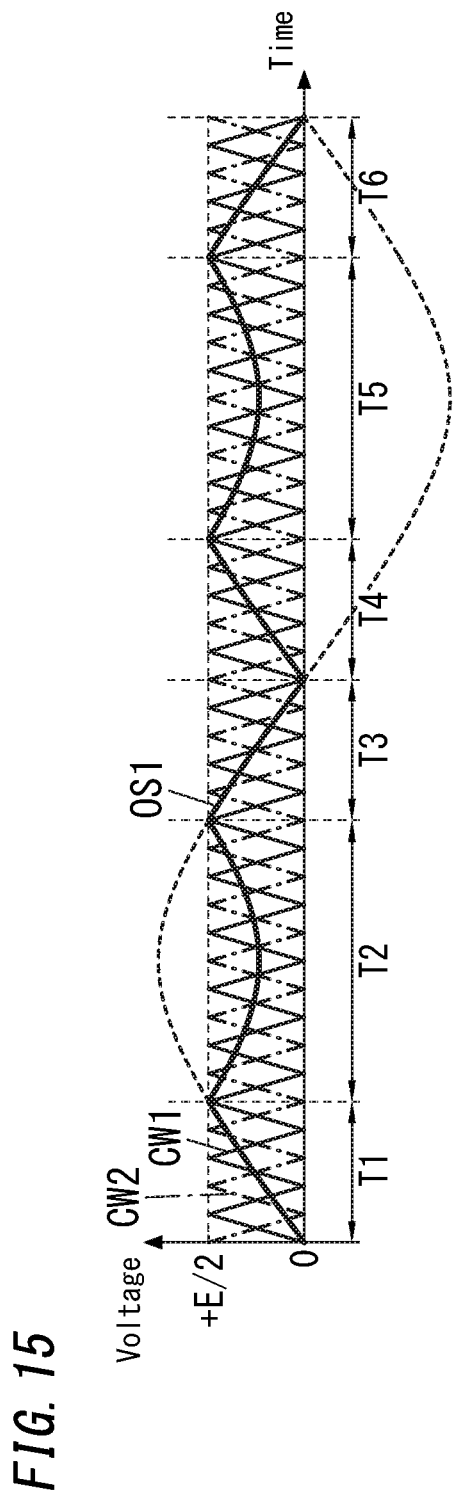
FIG. 15 is a waveform diagram illustrating a relationship between a signal wave and a reference wave in Embodiment 2.

Therefore, in the present embodiment, by devising the shape of the signal wave OS1, as shown in FIG. 15, the determination condition in accordance with which one of the sustaining mode, the charging mode, and the discharging mode is selected is made the same regardless of the terms T1 to T6. The first and second carrier waves CW1 and CW2 in the example in FIG. 15 respectively have the same waveforms as the first and second carrier waves CW1 and CW2 in the example in FIG. 14.

Meanwhile, the signal wave OS1 in the example in FIG. 15 has a waveform that is based on the same sine wave (indicated by broken lines in the drawing) as the utility grid 7, similarly to the example in FIG. 10 that was described in Embodiment 1, but is shaped such that the sine wave is appropriately shifted and inverted according to the terms T1 to T6. That is, the signal wave OS1 in FIG. 15 has a waveform such that the original sine wave is appropriately shifted and inverted so as to be fitted into a range from 0 [V], which is the minimum value of the first and second carrier waves CW1 and CW2, to E/2 [V], which is the maximum value thereof.

The power-converting device 1 of the present embodiment generates the PWM signal according to the result of comparison between the first and second carrier waves CW1 and CW2 and the signal wave OS1, as shown in FIG. 15, and switches between the sustaining mode and the charging mode or the discharging mode. This point will be described in more detail with reference to FIG. 16.

Hereinafter, description will be given in which the result of comparison between the first carrier wave CW1 and the signal wave OS1 is a first comparison signal Sj1 and the result of comparison between the second carrier wave CW2 and the signal wave OS1 is a second comparison signal Sj2. Also, description will be given in which the determination result as to whether the first carrier wave CW1 is rising (positive slope) or falling (negative slope) is a determination signal Sj0. The first comparison signal Sj1 is a signal that becomes "H" in a period in which the signal wave OS1 exceeds the first carrier wave CW1 (OS1>CW1). The second comparison signal Sj2 is a signal that becomes "H" in a period in which the signal wave OS1 exceeds the second carrier wave CW2 (OS1>CW2). The determination signal Sj0 is a signal that becomes "H" in a period in which the first carrier wave CW1 is rising. Furthermore, hereinafter, the controller 6 is assumed to output a charging signal Sc1 that becomes "H" in a period in which a conversion circuit 10 operates in the charging mode and a discharging signal Sd1 that becomes "H" in a period in which the conversion circuit 10 operates in the discharging mode.

The controller 6 selects one of the sustaining mode, the charging mode, and the discharging mode according to the first and second comparison signals Sj1 and Sj2 and the determination signal Sj0 in accordance with the determination condition shown in TABLE 4. Note that "-" in the table indicates the signal may be either of "H" or "L".

TABLE 4

| Comparison signal Sj1 | Comparison signal Sj2 | Determination signal Sj0 | Mode to be selected |
|---|---|---|---|
| L | — | H | sustaining mode |
| — | L | L | sustaining mode |
| H | — | H | charging mode |
| — | H | L | discharging mode |

Figure 16:
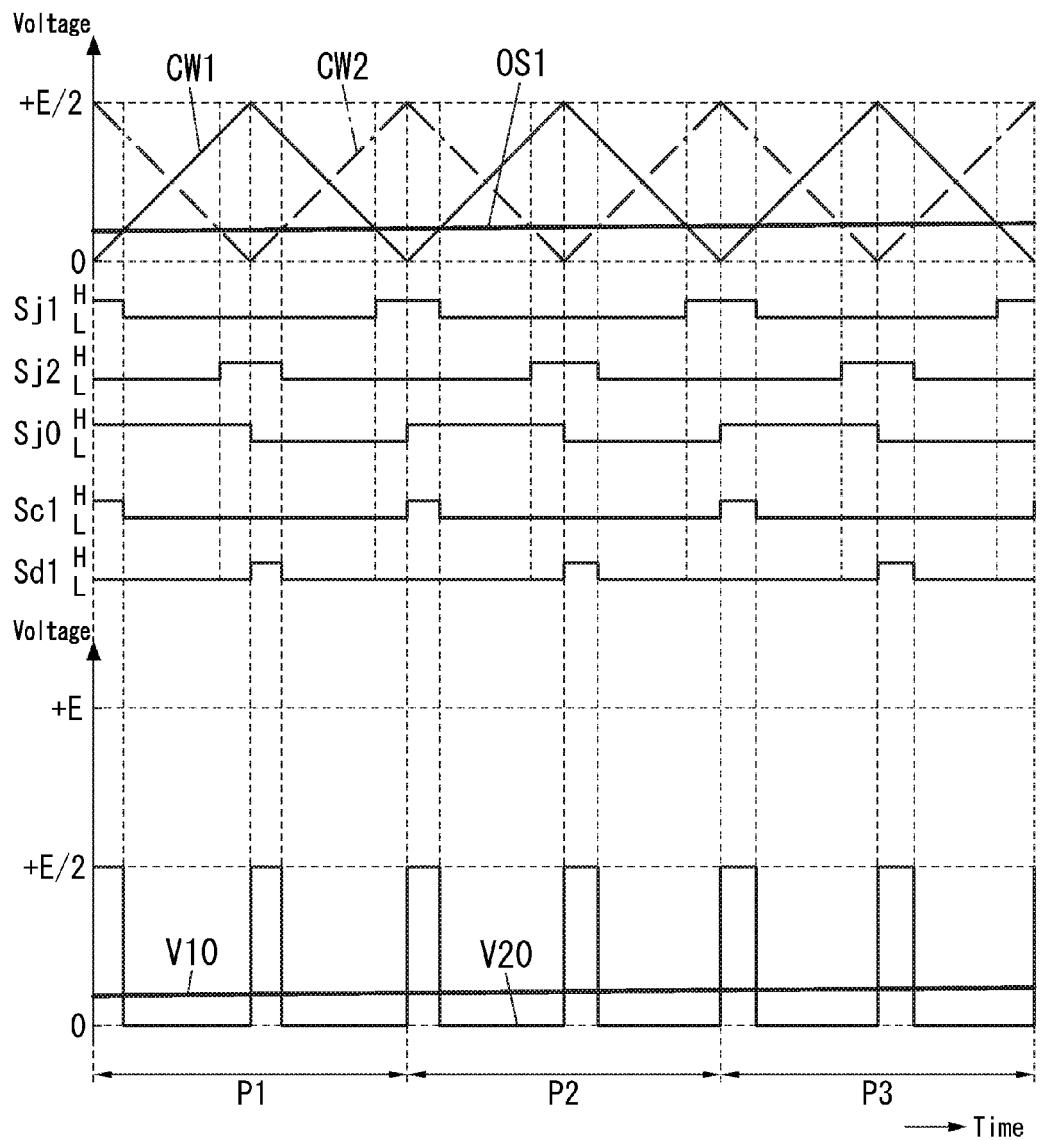
FIG. 16 is a timing chart illustrating an operation of a power-converting device according to Embodiment 2.

FIG. 16 shows the operation of the controller 6 in the term T1, as an example. That is, in the term T1, the controller 6 selects the charging mode in a period in which the signal wave OS1 exceeds the first carrier wave CW1 and first carrier wave CW1 is rising (period in which the first comparison signal Sj1 is "H" and the determination signal Sj0 is "H"), and sets the charging signal Sc1 to "H". Also, the controller 6 selects the discharging mode in a period in which the signal wave OS1 exceeds the second carrier wave CW2 and first carrier wave CW1 is falling (period in which the second comparison signal Sj2 is "H" and the determination signal Sj0 is "L"), and sets the discharging signal Sd1 to "H". Also, the controller 6 selects the sustaining mode in a period in which the signal wave OS1 is less than or equal to the first carrier wave CW1 (OS1≤CW1) and the first carrier wave CW1 is rising (period in which the first comparison signal Sj1 is "L" and the determination signal Sj0 is "H"). Furthermore, the controller 6 also selects the sustaining mode in a period in which the signal wave OS1 is less than or equal to the second carrier wave CW2 (OS1≤CW2) and first the carrier wave CW1 is falling (period in which the second comparison signal Sj2 is "L" and the determination signal Sj0 is "L").

Accordingly, in the power-converting device 1, both the charging mode and the discharging mode are included in one cycle (in each of the first to third cycles P1 to P3) of the first carrier wave CW1, as shown in FIG. 16. Here, in the term T1, the charging mode is the second mode, the discharging mode is the third mode, and the sustaining mode is the fourth mode. Therefore, in the term T1, the controller 6 switches between the second to fourth modes in the order of the second mode, the fourth mode, the third mode, and the fourth mode in each of the first to third cycles P1 to P3.

As a result, in each of the first to third cycles P1 to P3 in the term T1, the output voltage V20 switches in the order of E/2 [V] (second mode), 0 [V] (fourth mode), E/2 [V] (third mode), and 0 [V] (fourth mode) as shown in FIG. 16. Here, in the term T1, the second and third modes and the fourth mode are switched according to the PWM signal, and therefore, when the signal wave OS1 rises, the duty ratio of the fourth mode decreases, and the duty ratio of the second and third modes increases. In other words, in the output voltage V20, the duty ratio of 0 [V] decreases, and the duty ratio of E/2 [V] increases. Here, the output voltage V10 generated between the third output point 105 and the fourth output point 106 corresponds to the average value of the output voltage V20, and therefore, the output voltage V10 increases as the signal wave OS1 rises, as shown in FIG. 16.

Similarly, in the remaining terms T2 to T6, the power-converting device 1 switches between the sustaining mode, the charging mode, and the discharging mode according to the result of comparison between each of the carrier waves CW1 and CW2 and the signal wave OS1 and the determination result as to whether the carrier wave CW1 is rising or falling in accordance with the determination condition in TABLE 4.

According to the configuration of the present embodiment, the generation unit 3 generates carrier waves CW1 and CW2 having different phases as the reference wave, and the controller 6 switches between the charging mode and the discharging mode according to the result of comparison between each of the carrier waves CW1 and CW2 and the signal wave OS1. In this way, the controller 6 can interpose the sustaining mode between the charging mode and the discharging mode based on the result of comparison between the carrier waves CW1 and CW2 and the signal wave OS1. Therefore, the power-converting device 1 can alternately repeat the charging mode and the discharging mode at equal intervals, and can further suppress the voltage fluctuation of the capacitor.

The other configurations and functions are similar to those of Embodiment 1.

Embodiment 3

A power-converting device 1 of the present embodiment differs from the power-converting device 1 of Embodiment 1 in that a controller 6 is configured to select one of the charging mode and the discharging mode in each cycle of the reference wave such that one of the charging mode and the discharging mode is included in one cycle of the reference wave. The circuit configuration of the power-converting device 1 of the present embodiment is in common with the power-converting device 1 of Embodiment 1. Hereinafter, similar configurations to Embodiment 1 are provided with the same reference sign, and redundant description thereof will be omitted as appropriate.

That is, in Embodiment 1, a case was described in which the power-converting device 1 switches between the charging mode and the discharging mode in one cycle of the reference wave such that both the charging mode and the discharging mode are included in one cycle of the reference wave. On the other hand, the power-converting device 1 of the present embodiment does not perform switching between the charging mode and the discharging mode within one cycle of the reference wave such that only one of the charging mode and the discharging mode is included in one cycle of the reference wave.

In the present embodiment, the controller 6 selects one of the charging mode and the discharging mode in each cycle of the reference wave according to the detection result of a detection circuit. Here, the detection circuit includes a first detector 21 and a second detector 22, and the detection result of the detection circuit is an average value of the voltage V1 of a first capacitor C1 and the voltage V2 of a second capacitor C2. Specifically, the detection result of the first detector 21 (voltage V1 of the first capacitor C1) and the detection result of the second detector 22 (voltage V2 of the second capacitor C2) are outputted to a microcomputer 62. The microcomputer 62 obtains an average value Vc of the voltage V1 of the first capacitor C1 and the voltage V2 of the second capacitor C2 that are acquired in this way. Note that the average value Vc can be expressed by Vc=(V1+V2)/2.

Here, the controller 6 may select the charging mode if the voltage of the capacitor (average value Vc) detected by the detection circuit is smaller than a lower limit value of the target range, and select the discharging mode if the voltage of the capacitor detected by the detection circuit is larger than an upper limit value of the target range. That is, the power-converting device 1 of the present embodiment detects (measures) the voltage V1 of the first capacitor C1 and the voltage V2 of the second capacitor C2 through the detection circuit including the first detector 21 and the second detector 22. The controller 6 can fit the voltage of the capacitor into the target range by comparing the detection result (average value Vc) of the detection circuit with the lower limit value and the upper limit value of the target range. The target range mentioned here is a voltage range that is the target of the voltage V1 of the first capacitor C1 and the voltage V2 of the second capacitor C2, and is a fixed range (E/4±α [V]) with each center of the voltages being a reference voltage, for example. Note that the width of the target range can be arbitrarily set, and may be zero (lower limit value=upper limit value).

Figure 17:
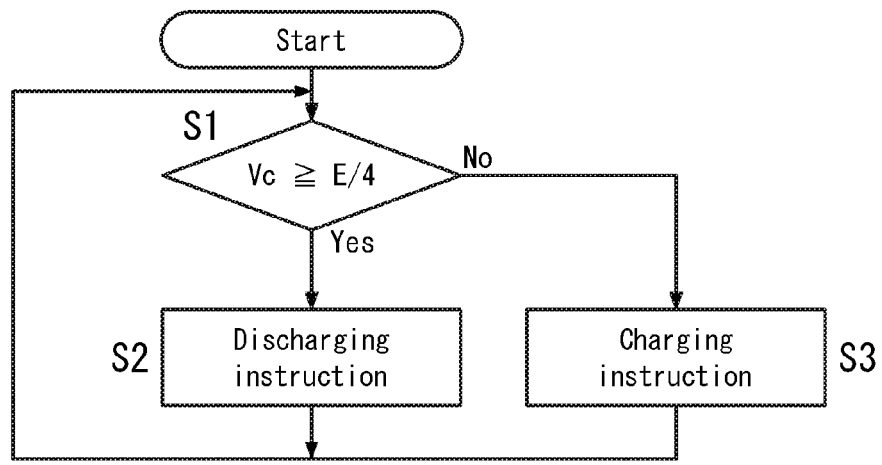
FIG. 17 is a flowchart illustrating an operation of a power-converting device according to Embodiment 3.

The controller 6 of the present embodiment described above operates in accordance with the flowchart shown in FIG. 17, for example. Note that, it is assumed that the width of the target range is set to zero, and the lower limit value and the upper limit value of the target range is the reference voltage (E/4 [V]).

The controller 6, first, compares the average value Vc of the voltage V1 of the first capacitor C1 and the voltage V2 of the second capacitor C2 with the reference voltage (E/4 [V]) (S1). Here, if the average value Vc is greater than or equal to the reference voltage (S1:Yes), the controller 6 outputs the discharging instruction (S2). On the other hand, if the average value Vc is less than the reference voltage (S1:No), the controller 6 outputs a charging instruction (S3).

The controller 6 outputs one of the charging instruction and the discharging instruction in each cycle of the carrier wave CW1 by repeatedly performing the processing from S1 to S3 at the same cycle as that of the carrier wave CW1.

In the present embodiment, the controller 6 is configured to switch between the charging mode and the discharging mode according to the charging instruction and the discharging instruction in place of the determination result as to whether the carrier wave CW1 is rising or falling.

Here, based on the signal wave OS1 as shown in FIG. 9 that was described in Embodiment 1, the controller 6 can generate the PWM signal according to the result of comparison between one carrier wave CW1 and the signal wave OS1, and switch between the sustaining mode and the charging mode or the discharging mode. Here, the carrier wave CW1 is a triangular wave that periodically oscillates between 0 [V] and E/2 [V], 0 [V] being the minimum value and E/2 [V] being the maximum value. Also, the carrier wave CW1 is a triangular wave in which the voltage change rate per unit time is equal when rising and falling. Note that the carrier wave CW1 in the present embodiment may be a triangular wave in which the voltage change rate per unit time is different when rising and falling, similarly to Embodiment 1. The carrier wave CW1 may be a sawtooth wave, for example.

Hereinafter, description will be given in which the result of comparison between the carrier wave CW1 and the signal wave OS1 is outputted as a comparison signal Sj1. The comparison signal Sj1 is a signal that becomes "H" in a period in which the signal wave OS1 exceeds the carrier wave CW1 (OS1>CW1). Furthermore, the controller 6 is assumed to output an instruction signal Scd1 that becomes "H" in a period in which the charging instruction is to be outputted and becomes "L" in a period in which the discharging instruction is to be outputted.

In the configuration based on the signal wave OS1 shown in FIG. 9, the controller 6 selects one of the sustaining mode, the charging mode, and the discharging mode according to the comparison signal Sj1 and the instruction signal Scd1 in accordance with the determination condition shown in TABLE 5. Note that, in this case, in the terms T1, T3, and T5, a period in which the carrier wave CW1 changes from the maximum value (E/2 [V]) to the minimum value (0 [V]), and again changes to the maximum value (E/2 [V]) is one cycle of the carrier wave CW1. On the other hand, in the terms T2, T4, and T6, a period in which the carrier wave CW1 changes from the minimum value (0 [V]) to the maximum value (E/2 [V]), and again changes to the minimum value (0 [V]) is one cycle of the carrier wave CW1. The controller 6 outputs one of the charging instruction and the discharging instruction in each cycle that is different according to the terms T1 to T6.

TABLE 5

| Term | Comparison signal Sj1 | Instruction signal Scd1 | Mode to be selected |
|---|---|---|---|
| T1, T3, T5 | L | H | sustaining mode |
| | L | L | sustaining mode |
| | H | H | charging mode |
| | H | L | discharging mode |
| T2, T4, T6 | H | H | sustaining mode |
| | H | L | sustaining mode |
| | L | H | charging mode |
| | L | L | discharging mode |

Note that, in the configuration based on the signal wave OS1 as shown in FIG. 9, the determination condition in accordance with which the mode to be applied is selected from the sustaining mode, the charging mode, and the discharging mode may be different according to the terms T1 to T6, as shown in TABLE 5. For example, the condition in accordance with which the charging mode is selected is that the comparison signal Sj1 is "H" and the instruction signal Scd1 is "H" in the term T1. On the other hand, the condition is that comparison signal Sj1 is "L" and the instruction signal Scd1 is "H" in the term T2, and therefore, the determination condition is different in the terms T1 and T2.

Therefore, in the present embodiment, similarly to Embodiment 1 (refer to FIG. 10), the signal wave OS1 has a waveform that is based on the same sine wave as the utility grid 7, but is not the sine wave itself, and is shaped such that the sine wave is appropriately shifted and inverted according to the terms T1 to T6. In the present embodiment, as a result of devising the shape of the signal wave OS1, the determination condition in accordance with which one of the sustaining mode, the charging mode, and the discharging mode is selected is made the same regardless of the terms T1 to T6.

In the configuration based on the signal wave OS1 shown in FIG. 10, the controller 6 of the present embodiment selects one of the sustaining mode, the charging mode, and the discharging mode according to the comparison signal Sj1 and the instruction signal Scd1 in accordance with the determination condition shown in TABLE 6 regardless of the terms T1 to T6. Note that, in this case, a period in which the carrier wave CW1 changes from the maximum value (E/2 [V]) to the minimum value (0 [V]) and then again changes to the maximum value (E/2 [V]) is the one cycle of the carrier wave CW1 regardless of the terms T1 to T6. The controller 6 outputs one of the charging instruction and the discharging instruction in each cycle that is determined in the same way regardless of the terms T1 to T6.

TABLE 6

| Comparison signal Sj1 | Instruction signal Scd1 | Mode to be selected |
|---|---|---|
| L | H | sustaining mode |
| L | L | sustaining mode |
| H | H | charging mode |
| H | L | discharging mode |

The operation of the controller 6 in accordance with the determination condition shown in TABLE 6 will be described in more detail with reference to FIG. 18. Hereinafter, the controller 6 is assumed to output a charging signal Sc1 that becomes "H" in a period in which the conversion circuit 10 operates in the charging mode and a discharging signal Sd1 that becomes "H" in a period in which the conversion circuit 10 operates in the discharging mode. Note that, in the example in FIG. 18, a period in which the carrier wave CW1 changes from the maximum value (E/2 [V]) to the minimum value (0 [V]) and then again changes to the maximum value (E/2 [V]) is one cycle of the carrier wave CW1 (each of the first to fourth cycles P1 to P4).

Figure 18:
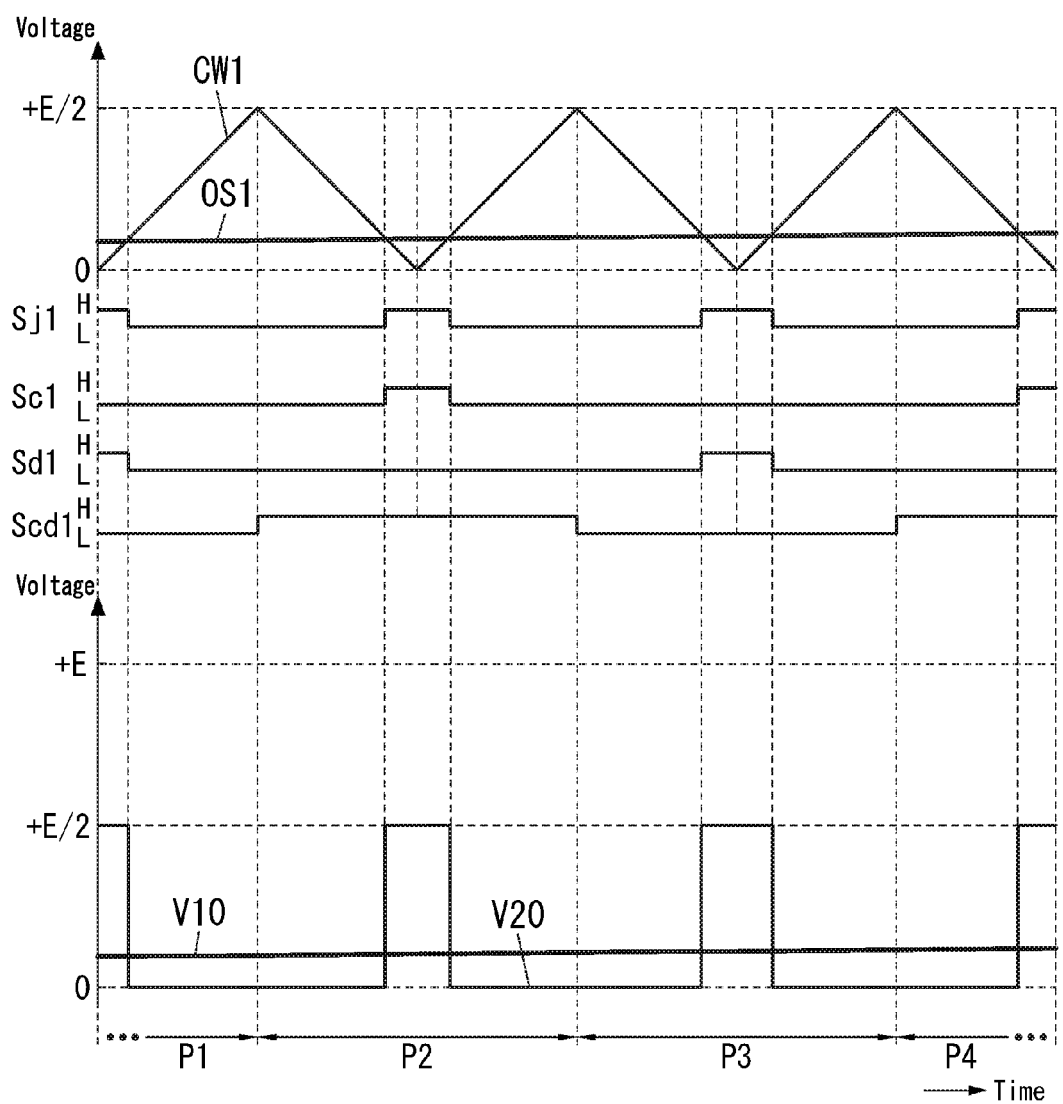
FIG. 18 is a timing chart illustrating the operation of the power-converting device according to Embodiment 3.

FIG. 18 shows the operation of the controller 6 in the term T1 as an example. That is, in the term T1, the controller 6 selects the charging mode or the discharging mode in a period in which the signal wave OS1 exceeds the carrier wave CW1 (period in which the comparison signal Sj1 is "H"). In a period in which the signal wave OS1 is less than or equal to the carrier wave CW1 (OS1≤CW1) (period in which the comparison signal Sj1 is "L"), the controller 6 selects the sustaining mode. Also, the controller 6 selects, in a period in which the signal wave OS1 exceeds the carrier wave CW1, the charging mode in a period in which the charging instruction is outputted (period in which the instruction signal Scd1 is "H"), and sets the charging signal Sc1 to "H". The controller 6 selects, in a period in which the signal wave OS1 exceeds the carrier wave CW1, the discharging mode in a period in which the discharging instruction is outputted (period in which the instruction signal Scd1 is "L"), and sets the discharging signal Sd1 to "H".

Accordingly, in the power-converting device 1, only one of the charging mode and the discharging mode is included in one cycle (each of the first to fourth cycles P1 to P4) of the carrier wave CW1 as shown in FIG. 18. Here, the charging mode in the term T1 is the second mode, the discharging mode is the third mode, and the sustaining mode is the fourth mode. Therefore, in each of the second and fourth cycles P2 and P4 in which the charging instruction is outputted, the controller 6 switches between the second to fourth modes in the order of the fourth mode, the second mode, and the fourth mode. Also, in each of the first and third cycles P1 and P3 in which the discharging instruction is outputted, the controller 6 switches the second to fourth modes, in the order of the fourth mode, the third mode, and the fourth mode.

As a result, in each of the first to fourth cycles P1 to P4 in the term T1, the output voltage V20 generated between the first output point 103 and the second output point 104 switches in the order of 0 [V] (fourth mode), E/2 [V] (second and third modes), and 0 [V] (fourth mode), as shown in FIG. 18. Here, in the term T1, the second and third modes and the fourth mode are switched according to the PWM signal, and therefore, when the signal wave OS1 rises, the duty ratio of the fourth mode decreases, and the duty ratio of the second and third modes increases. In other words, in the output voltage V20, the duty ratio of 0 [V] decreases, and the duty ratio of E/2 [V] increases. Here, the output voltage V10 generated between the third output point 105 and the fourth output point 106 corresponds to the average value of the output voltage V20, and therefore, the output voltage V10 increases as the signal wave OS1 rises, as shown in FIG. 18.

Similarly, in the remaining terms T2 to T6, the power-converting device 1 of the present embodiment switches between the sustaining mode, the charging mode, and the discharging mode according to the result of comparison between the carrier wave CW1 and the signal wave OS1 and the charging instruction or the discharging instruction in accordance with the determination condition in TABLE 6.

According to the configuration of the present embodiment described above, the controller 6 selects one of the charging mode and the discharging mode in each cycle of the reference wave such that only one of the charging mode and the discharging mode is included in one cycle of the reference wave. As a result, compared with the configuration in which the charging mode and the discharging mode are switched in one cycle of the reference wave, the frequency of switching between the charging mode and the discharging mode can be suppressed to be low, and the power-converting device 1 can reduce the switching loss, and the efficiency improves.

Note that the power-converting device 1 can make the timing, at which the charging instruction and the discharging instruction are switched, uniformly match the peak (E/2 [V]) of the carrier wave CW1 based on the signal wave OS1 as shown in FIG. 10, regardless of the terms T1 to T6.

Also, the controller 6 preferably selects one of the charging mode and the discharging mode in each cycle of the reference wave according to the voltage of the capacitor detected by the detection circuit (first detector 21 and second detector 22) as in the present embodiment.

According to this configuration, even in a case where the voltage of the capacitor is shifted from the reference voltage, the controller 6 can correct this shift by selecting one of the charging mode and the discharging mode in each cycle of the reference wave.

In this case, the controller 6 preferably selects the charging mode if the voltage of the capacitor detected by the detection circuit is smaller than the lower limit value of the target range, and selects the discharging mode if the voltage of the capacitor detected by the detection circuit is larger than the upper limit value of the target range.

According to this configuration, as a result of making the target range of the voltage of the capacitor have a width of some degree, the power-converting device 1 can suppress the frequency of switching between the charging mode and the discharging mode to be low by not responding to a minute voltage fluctuation of the capacitor caused by charging and discharging of the capacitor or by noise. Therefore, the power-converting device 1 can reduce the switching loss, and the efficiency improves.

Note that the configuration in which one of the charging mode and the discharging mode is selected in each cycle of the reference wave according to the voltage of the capacitor detected by the detection circuit (first detector 21 and second detector 22) is not an essential configuration, and may be omitted appropriately.

The other configurations and functions are similar to those of Embodiment 1.

The invention claimed is:

1. A power-converting device comprising:
a conversion circuit that includes switches and a capacitor, and is electrically connected between a first input point on a high potential side of a DC power supply and a second input point on a low potential side of the DC power supply;
a controller configured to switch between modes in each of which a connection state of the DC power supply and the capacitor with respect to a first output point and a second output point is different by controlling the switches, and change a magnitude of an output voltage to be generated between the first output point and the second output point in multi-levels according to a signal wave that is based on a target value of the output voltage; and
a generation unit configured to generate a reference wave constituted by at least one carrier wave,
the modes being classified into a sustaining mode in which a current is not caused to flow to the capacitor, a charging mode in which the capacitor is charged by causing a current to flow to the capacitor, and a discharging mode in which the capacitor is discharged by causing a current to flow to the capacitor in a direction opposite to that in the charging mode, and
the controller being configured to switch between the sustaining mode and the charging mode or the discharging mode according to a result of comparison between the signal wave and the reference wave,
wherein the conversion circuit includes a first conversion circuit and a second conversion circuit that are electrically connected in parallel between the first input point and the second input point and a first bi-directional switch and a second bi-directional switch that are electrically connected between the first conversion circuit and the second conversion circuit,
the first conversion circuit includes: first to fourth switching elements that are electrically connected in series between the first input point and the second input point in the order of the first switching element, the second switching element, the third switching element, and the fourth switching element from the first input point side; and a first capacitor that is electrically connected in parallel to a series circuit of the second switching element and the third switching element,
a connection point of the second switching element and the third switching element is the first output point, the second conversion circuit includes: fifth to eighth switching elements that are electrically connected in series between the first input point and the second input point in the order of the fifth switching element, the sixth switching element, the seventh switching element, and the eighth switching element from the first input point side; and a second capacitor that is electrically connected in parallel to a series circuit of the sixth switching element and the seventh switching element, a connection point of the sixth switching element and the seventh switching element is the second output point, the first bi-directional switch is connected between a first connection point that is a connection point of the first switching element and the second switching element and a second connection point that is a connection point of the seventh switching element and the eighth switching element, the second bi-directional switch is connected between a third connection point that is a connection point of the third switching element and the fourth switching element and a fourth connection point that is a connection point of the fifth switching element and the sixth switching element, the switches are constituted by the first to eighth switching elements, the first bi-directional switch, and the second bi-directional switch, and the capacitor is constituted by the first capacitor and the second capacitor.

2. A power conditioner comprising:
the power-converting device according to claim 1; and
a parallel off device that is electrically connected between the first and second output points and a utility grid.

3. The power-converting device according to claim 1, wherein the controller is configured to switch between the sustaining mode and the charging mode or the discharging mode such that each of the first capacitor and the second capacitor repeats charging and discharging so as to have a voltage that changes with a center of the voltage being a reference voltage, the reference voltage being a voltage having a magnitude that is a quarter of the voltage applied between the first input point and the second input point from the DC power supply.

4. The power-converting device according to claim 3, further comprising:
a first detector configured to detect a voltage of the first capacitor; and
a second detector configured to detect a voltage of the second capacitor,
wherein the controller is configured to switch between the sustaining mode and the charging mode or the discharging mode such that an average value of a detection result of the first detector and a detection result of the second detector is equal to the reference voltage.

5. The power-converting device according to claim 1, wherein the controller is configured to switch between the charging mode and the discharging mode in one cycle of the reference wave such that both the charging mode and the discharging mode are included in one cycle of the reference wave.

6. The power-converting device according to claim 5, further comprising a detection circuit configured to detect a voltage of the capacitor, wherein the controller is configured to adjust respective ratios of the charging mode and the discharging mode that occupy one cycle of the reference wave according to the voltage of the capacitor detected by the detection circuit.

7. The power-converting device according to claim 6, wherein the controller is configured to increase the ratio of the charging mode if the voltage of the capacitor detected by the detection circuit is smaller than a lower limit value of a target range, and increase the ratio of the discharging mode if the voltage of the capacitor detected by the detection circuit is larger than an upper limit value of the target range.

8. The power-converting device according to claim 5, wherein the generation unit is configured to generate one continuous carrier wave as the reference wave, and
the controller is configured to switch between the charging mode and the discharging mode according to a determination result as to whether the carrier wave is rising or falling.

9. The power-converting device according to claim 5, wherein the generation unit is configured to generate carrier waves each having a different phase as the reference wave, and
the controller is configured to switch between the charging mode and the discharging mode according to a result of comparison between each of the carrier waves and the signal wave.

10. The power-converting device according to claim 1, wherein the controller is configured to select one of the charging mode and the discharging mode in each cycle of the reference wave such that only one of the charging mode and the discharging mode is included in one cycle of the reference wave.

11. The power-converting device according to claim 10, further comprising a detection circuit configured to detect a voltage of the capacitor,
wherein the controller is configured to select one of the charging mode and the discharging mode in each cycle of the reference wave according to the voltage of the capacitor.

12. The power-converting device according to claim 11, wherein the controller is configured to select the charging mode if the voltage of the capacitor detected by the detection circuit is smaller than a lower limit value of a target range, and select the discharging mode if the voltage of the capacitor detected by the detection circuit is larger than an upper limit value of the target range.

13. The power-converting device according to claim 1, wherein the controller is configured to select the charging mode continuously in a start-up period from when supply of power to the conversion circuit from the DC power supply is started until when the capacitor is charged to a predetermined voltage.

14. The power-converting device according to claim 1, wherein the controller includes, as operating states, a first state in which the sustaining mode and the charging mode are switched according to a result of comparison between the signal wave and the reference wave and a second state in which the sustaining mode and the discharging mode are switched according to a result of comparison between the signal wave and the reference wave.

* * * * *